US006972505B1

(12) United States Patent
Leijon et al.

(10) Patent No.: US 6,972,505 B1
(45) Date of Patent: *Dec. 6, 2005

(54) ROTATING ELECTRICAL MACHINE HAVING HIGH-VOLTAGE STATOR WINDING AND ELONGATED SUPPORT DEVICES SUPPORTING THE WINDING AND METHOD FOR MANUFACTURING THE SAME

(75) Inventors: Mats Leijon, Vasteras (SE); Peter Templin, Västra Frölunda (SE); Bengt Rydholm, Vasteras (SE); Lars Gertmar, Vasteras (SE); Bertil Larsson, Vasteras (SE); Bengt Rothman, Vasteras (SE); Peter Carstensen, Huddinge (SE); Leif Johansson, Alingsas (SE); Claes Ivarson, Vasteras (SE); Bo Hernnas, Vasteras (SE); Goran Holmstrom, Sollentuna (SE); Bengt Goran, Vasteras (SE); Alberti Backlund, Hallstahammar (SE)

(73) Assignee: ABB, Vasteras (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/147,325

(22) PCT Filed: May 27, 1997

(86) PCT No.: PCT/SE97/00897

§ 371 (c)(1),
(2), (4) Date: Feb. 17, 1999

(87) PCT Pub. No.: WO97/45935

PCT Pub. Date: Dec. 4, 1997

(30) Foreign Application Priority Data

| | | |
|---|---|---|
| May 29, 1996 | (SE) | 9602079 |
| May 29, 1996 | (SE) | 9602085 |
| Nov. 4, 1996 | (SE) | 9604031 |
| Feb. 3, 1997 | (SE) | 9700362 |

(51) Int. Cl.[7] ........................... H02K 3/40; H02K 15/12

(52) U.S. Cl. ....................... 310/196; 310/180; 310/215; 174/DIG. 20; 174/DIG. 27; 174/DIG. 33

(58) Field of Search ......................... 310/215, 179–180, 310/184, 195–196, 198–208, 254; 174/DIG. 13–33

(56) References Cited

U.S. PATENT DOCUMENTS

| | | |
|---|---|---|
| 681,800 A | 9/1901 | Lasche |
| 847,008 A | 3/1907 | Kitsee |

(Continued)

FOREIGN PATENT DOCUMENTS

| | | |
|---|---|---|
| AT | 399790 | 7/1995 |
| BE | 565063 | 2/1957 |

(Continued)

OTHER PUBLICATIONS

Shipboard Electrical Insulation; G. L. Moses, 1951, pp2&3.
ABB Elkrafthandbok; ABB AB; 1988 ; pp274–276.

(Continued)

*Primary Examiner*—Burton Mullins
(74) *Attorney, Agent, or Firm*—Oblon, Spivak, McClelland, Maier & Neustadt, P.C.

(57) ABSTRACT

A rotating electrical machine and method for making the machine, where the machine includes a high-voltage stator winding and elongated support devices for supporting the winding. The machine and method employ an arrangement of cable that is made of inner conductive strands, covered with a first semiconducting layer, which is covered with an insulating layer, which is covered with a second semiconducting layer. The cable is wound in slots in the stator such that separate cable lead-throughs are positioned in specific arrangements with respect to each other and in slots of the stator. The arrangement of the cable in the stator protects the integrity of the respective components in the cable and particularly the second semiconducting layer.

81 Claims, 7 Drawing Sheets

U.S. PATENT DOCUMENTS 1,304,451 A 5/1919 Burnham
1,418,856 A 6/1922 Williamson
1,481,585 A 1/1924 Beard
1,508,456 A 9/1924 Lenz
1,728,915 A 9/1929 Blankenship et al.
1,742,985 A 1/1930 Burnham
1,747,507 A 2/1930 George
1,756,672 A 4/1930 Barr
1,762,775 A 6/1930 Ganz
1,781,308 A 11/1930 Vos
1,861,182 A 5/1932 Hendey et al.
1,904,885 A 4/1933 Seeley
1,974,406 A 9/1934 Apple et al.
2,006,170 A 6/1935 Juhlin
2,206,856 A 7/1940 Shearer
2,217,430 A 10/1940 Baudry
2,241,832 A 5/1941 Wahlquist
2,251,291 A 8/1941 Reichelt
2,256,897 A 9/1941 Davidson et al.
2,295,415 A 9/1942 Monroe
2,409,893 A 10/1946 Pendleton et al.
2,415,652 A 2/1947 Norton
2,424,443 A 7/1947 Evans
2,436,306 A 2/1948 Johnson
2,446,999 A 8/1948 Camilli
2,459,322 A 1/1949 Johnston
2,462,651 A 2/1949 Lord
2,498,238 A 2/1950 Berberich et al.
2,650,350 A 8/1953 Heath
2,721,905 A 10/1955 Monroe
2,749,456 A 6/1956 Luenberger
2,780,771 A 2/1957 Lee
2,846,599 A 8/1958 McAdam
2,885,581 A 5/1959 Pileggi
2,943,242 A 6/1960 Schaschl et al.
2,947,957 A 8/1960 Spindler
2,959,699 A 11/1960 Smith et al.
2,962,679 A 11/1960 Stratton
2,975,309 A 3/1961 Seidner
3,014,139 A * 12/1961 Shildneck .................. 310/214
3,098,893 A 7/1963 Pringle et al.
3,130,335 A 4/1964 Rejda
3,143,269 A 8/1964 Van Eldik
3,157,806 A 11/1964 Wiedemann
3,158,770 A 11/1964 Coggeshall et al.
3,197,723 A 7/1965 Dortort
3,268,766 A 8/1966 Amos
3,304,599 A 2/1967 Nordin
3,354,331 A 11/1967 Broeker et al.
3,365,657 A 1/1968 Webb
3,372,283 A 3/1968 Jaecklin
3,392,779 A 7/1968 Tilbrook
3,411,027 A 11/1968 Rosenberg
3,418,530 A 12/1968 Cheever
3,435,262 A 3/1969 Bennett et al.
3,437,858 A 4/1969 White
3,444,407 A 5/1969 Yates
3,447,002 A 5/1969 Ronnevig
3,484,690 A 12/1969 Wald
3,541,221 A 11/1970 Aupoix et al.
3,560,777 A 2/1971 Moeller
3,571,690 A 3/1971 Lataisa
3,593,123 A 7/1971 Williamson
3,631,519 A 12/1971 Salahshourian
3,644,662 A 2/1972 Salahshourian
3,651,244 A 3/1972 Silver et al.
3,651,402 A 3/1972 Leffmann
3,660,721 A 5/1972 Baird
3,666,876 A 5/1972 Forster
3,670,192 A 6/1972 Andersson et al.
3,675,056 A 7/1972 Lenz
3,684,821 A 8/1972 Miyauchi et al.
3,684,906 A 8/1972 Lexz
3,699,238 A 10/1972 Hansen et al.
3,716,652 A 2/1973 Lusk et al.
3,716,719 A 2/1973 Angelery et al.
3,727,085 A 4/1973 Goetz et al.
3,740,600 A 6/1973 Turley
3,743,867 A 7/1973 Smith, Jr.
3,746,954 A 7/1973 Myles et al.
3,758,699 A 9/1973 Lusk et al.
3,778,891 A 12/1973 Amasino et al.
3,781,739 A 12/1973 Meyer
3,787,607 A 1/1974 Schlafly
3,792,399 A 2/1974 McLyman
3,801,843 A 4/1974 Corman et al.
3,809,933 A 5/1974 Sugawara et al.
3,813,764 A 6/1974 Tanaka et al.
3,820,048 A 6/1974 Ohta et al.
3,828,115 A 8/1974 Hvizd, Jr.
3,881,647 A 5/1975 Wolfe
3,884,154 A 5/1975 Marten
3,891,880 A 6/1975 Britsch
3,902,000 A 8/1975 Forsyth et al.
3,912,957 A 10/1975 Reynolds
3,932,779 A * 1/1976 Madsen ...................... 310/215
3,932,791 A 1/1976 Oswald
3,943,392 A 3/1976 Keuper et al.
3,947,278 A 3/1976 Youtsey
3,965,408 A 6/1976 Higuchi et al.
3,968,388 A 7/1976 Lambrecht et al.
3,971,543 A 7/1976 Shanahan
3,974,314 A 8/1976 Fuchs
3,993,860 A 11/1976 Snow et al.
3,995,785 A 12/1976 Arick et al.
4,001,616 A 1/1977 Lonseth et al.
4,008,367 A 2/1977 Sunderhauf
4,008,409 A 2/1977 Rhudy et al.
4,031,310 A 6/1977 Jachimowicz
4,039,740 A 8/1977 Iwata
4,041,431 A 8/1977 Enoksen
4,047,138 A 9/1977 Steigerwald
4,064,419 A 12/1977 Peterson
4,084,307 A 4/1978 Schultz et al.
4,085,347 A 4/1978 Lichius
4,088,953 A 5/1978 Sarian
4,091,138 A 5/1978 Takagi et al.
4,091,139 A 5/1978 Quirk
4,099,227 A 7/1978 Liptak
4,103,075 A 7/1978 Adam
4,106,069 A 8/1978 Trautner et al.
4,107,092 A 8/1978 Carnahan et al.
4,109,098 A 8/1978 Olsson et al.
4,121,148 A 10/1978 Platzer
4,132,914 A 1/1979 Khutoretsky et al.
4,134,036 A 1/1979 Curtiss
4,134,055 A 1/1979 Akamatsu
4,134,146 A 1/1979 Stetson
4,149,101 A 4/1979 Lesokhin et al.
4,152,615 A 5/1979 Calfo et al.
4,160,193 A 7/1979 Richmond
4,164,672 A 8/1979 Flick
4,164,772 A 8/1979 Hingorani
4,177,397 A 12/1979 Lill
4,177,418 A 12/1979 Brueckner et al.
4,184,186 A 1/1980 Barkan
4,200,817 A 4/1980 Bratoljic
4,200,818 A 4/1980 Ruffing et al.
4,206,434 A 6/1980 Hase
4,207,427 A 6/1980 Beretta et al.
4,207,482 A 6/1980 Neumeyer et al.

4,208,597 A 6/1980 Mulach et al.
4,229,721 A 10/1980 Koloczek et al.
4,238,339 A 12/1980 Khutoretsky et al.
4,239,999 A 12/1980 Vinokurov et al.
4,245,182 A 1/1981 Aotsu et al.
4,246,694 A 1/1981 Raschbichler et al.
4,255,684 A 3/1981 Mischler et al.
4,258,280 A 3/1981 Starcevic
4,262,209 A 4/1981 Berner
4,274,027 A 6/1981 Higuchi et al.
4,281,264 A 7/1981 Keim et al.
4,292,558 A 9/1981 Flick et al.
4,307,311 A 12/1981 Grozinger
4,308,476 A 12/1981 Schuler
4,308,575 A 12/1981 Mase
4,310,966 A 1/1982 Breitenbach
4,314,168 A 2/1982 Breitenbach
4,317,001 A 2/1982 Silver et al.
4,320,645 A 3/1982 Stanley
4,321,426 A 3/1982 Schaeffer et al.
4,321,518 A 3/1982 Akamatsu
4,326,181 A 4/1982 Allen
4,330,726 A 5/1982 Albright et al.
4,337,922 A 7/1982 Streiff et al.
4,341,989 A 7/1982 Sandberg et al.
4,347,449 A 8/1982 Beau
4,347,454 A 8/1982 Gellert et al.
4,353,612 A 10/1982 Meyers
4,357,542 A 11/1982 Kirschbaum
4,360,748 A 11/1982 Raschbichler et al.
4,361,723 A 11/1982 Hvizd, Jr. et al.
4,365,178 A 12/1982 Lenz
4,367,425 A 1/1983 Mendelsohn et al.
4,367,890 A 1/1983 Spirk
4,368,418 A 1/1983 Demello et al.
4,369,389 A 1/1983 Lambrecht
4,371,745 A 2/1983 Sakashita
4,384,944 A 5/1983 Silver et al.
4,387,316 A 6/1983 Katsekas
4,401,920 A 8/1983 Taylor et al.
4,403,163 A 9/1983 Rarmerding et al.
4,404,486 A 9/1983 Keim et al.
4,411,710 A 10/1983 Mochizuki et al.
4,421,284 A 12/1983 Pan
4,425,521 A 1/1984 Rosenberry, Jr. et al.
4,426,771 A 1/1984 Wang et al.
4,429,244 A 1/1984 Nikitin et al.
4,431,960 A 2/1984 Zucker
4,432,029 A 2/1984 Lundqvist
4,437,464 A 3/1984 Crow
4,443,725 A 4/1984 Derderian et al.
4,470,884 A 9/1984 Carr
4,473,765 A 9/1984 Butman, Jr. et al.
4,475,075 A 10/1984 Munn
4,477,690 A 10/1984 Nikitin et al.
4,481,438 A 11/1984 Keim
4,484,106 A 11/1984 Taylor et al.
4,488,079 A 12/1984 Dailey et al.
4,490,651 A 12/1984 Taylor et al.
4,503,284 A 3/1985 Minnick et al.
4,508,251 A 4/1985 Harada et al.
4,510,077 A 4/1985 Elton
4,517,471 A 5/1985 Sachs
4,520,287 A 5/1985 Wang et al.
4,523,249 A 6/1985 Arimoto
4,538,131 A 8/1985 Baier et al.
4,546,210 A 10/1985 Akiba et al.
4,551,780 A 11/1985 Canay
4,552,990 A 11/1985 Persson et al.
4,557,038 A 12/1985 Wcislo et al.
4,560,896 A 12/1985 Vogt et al.
4,565,929 A 1/1986 Baskin et al.
4,571,453 A 2/1986 Takaoka et al.
4,588,916 A 5/1986 Lis
4,590,416 A 5/1986 Porche et al.
4,594,630 A 6/1986 Rabinowitz et al.
4,607,183 A 8/1986 Rieber et al.
4,615,109 A 10/1986 Wcislo et al.
4,615,778 A 10/1986 Elton
4,618,795 A 10/1986 Cooper et al.
4,619,040 A 10/1986 Wang et al.
4,622,116 A 11/1986 Elton et al.
4,633,109 A 12/1986 Feigel
4,650,924 A 3/1987 Kauffman et al.
4,652,963 A 3/1987 Fahlen
4,656,316 A 4/1987 Meltsch
4,656,379 A 4/1987 McCarty
4,663,603 A 5/1987 van Riemsdijk et al.
4,677,328 A 6/1987 Kumakura
4,687,882 A 8/1987 Stone et al.
4,692,731 A 9/1987 Osinga
4,723,083 A 2/1988 Elton
4,723,104 A 2/1988 Rohatyn
4,724,345 A 2/1988 Elton et al.
4,732,412 A 3/1988 van der Linden et al.
4,737,704 A 4/1988 Kalinnikov et al.
4,745,314 A 5/1988 Nakano
4,761,602 A 8/1988 Leibovich
4,766,365 A 8/1988 Bolduc et al.
4,771,168 A 9/1988 Gundersen et al.
4,785,138 A * 11/1988 Breitenbach et al. ....... 174/106
4,795,933 A 1/1989 Sakai
4,827,172 A 5/1989 Kobayashi
4,845,308 A 7/1989 Womack, Jr. et al.
4,847,747 A 7/1989 Abbondanti
4,853,565 A * 8/1989 Elton et al. .................. 310/45
4,859,810 A 8/1989 Cloetens et al.
4,859,989 A 8/1989 McPherson
4,860,430 A 8/1989 Raschbichler et al.
4,864,266 A 9/1989 Feather et al.
4,883,230 A 11/1989 Lindstrom
4,890,040 A 12/1989 Gundersen
4,894,284 A 1/1990 Yamanouchi et al.
4,914,386 A 4/1990 Zocholl
4,918,347 A 4/1990 Takaba
4,918,835 A 4/1990 Wcislo et al.
4,924,342 A 5/1990 Lee
4,926,079 A 5/1990 Niemela et al.
4,942,326 A 7/1990 Butler, III et al.
4,949,001 A 8/1990 Campbell
4,982,147 A 1/1991 Lauw
4,994,952 A 2/1991 Silva et al.
4,997,995 A 3/1991 Simmons et al.
5,012,125 A 4/1991 Conway
5,030,813 A 7/1991 Stanisz
5,036,165 A 7/1991 Elton et al.
5,036,238 A 7/1991 Tajima
5,066,881 A 11/1991 Elton et al.
5,067,046 A 11/1991 Elton et al.
5,083,360 A 1/1992 Valencic et al.
5,086,246 A 2/1992 Dymond et al.
5,091,609 A 2/1992 Sawada et al.
5,094,703 A 3/1992 Takaoka et al.
5,095,175 A 3/1992 Yoshida et al.
5,097,241 A 3/1992 Smith et al.
5,097,591 A 3/1992 Wcislo et al.
5,111,095 A 5/1992 Hendershot
5,124,607 A 6/1992 Rieber et al.
5,136,459 A 8/1992 Fararooy
5,140,290 A 8/1992 Dersch
5,153,460 A 10/1992 Bovino et al.
5,168,662 A 12/1992 Nakamura et al.

| | | | | |
|---|---|---|---|---|
| 5,171,941 A | | 12/1992 | Shimizu et al. | |
| 5,175,396 A | | 12/1992 | Emery et al. | |
| 5,182,537 A | | 1/1993 | Thuis | |
| 5,187,428 A | | 2/1993 | Hutchison et al. | |
| 5,231,249 A | | 7/1993 | Kimura et al. | |
| 5,235,488 A | | 8/1993 | Koch | |
| 5,246,783 A | | 9/1993 | Spenadel et al. | |
| 5,264,778 A | | 11/1993 | Kimmel et al. | |
| 5,287,262 A | | 2/1994 | Klein | |
| 5,293,146 A | | 3/1994 | Aosaki et al. | |
| 5,304,883 A | | 4/1994 | Denk | |
| 5,305,961 A | | 4/1994 | Errard et al. | |
| 5,321,308 A | | 6/1994 | Johncock | |
| 5,323,330 A | | 6/1994 | Asplund et al. | |
| 5,325,008 A | * | 6/1994 | Grant | 310/214 |
| 5,325,259 A | | 6/1994 | Paulsson | |
| 5,327,637 A | | 7/1994 | Breitenbach et al. | |
| 5,341,281 A | | 8/1994 | Skibinski | |
| 5,343,139 A | | 8/1994 | Gyugyi et al. | |
| 5,355,046 A | | 10/1994 | Weigelt | |
| 5,365,132 A | | 11/1994 | Hann et al. | |
| 5,387,890 A | | 2/1995 | Estop et al. | |
| 5,397,513 A | | 3/1995 | Steketee, Jr. | |
| 5,399,941 A | | 3/1995 | Grothaus et al. | |
| 5,400,005 A | | 3/1995 | Bobry | |
| 5,408,169 A | | 4/1995 | Jeanneret | |
| 5,449,861 A | | 9/1995 | Fujino et al. | |
| 5,452,170 A | | 9/1995 | Ohde et al. | |
| 5,468,916 A | | 11/1995 | Litenas et al. | |
| 5,499,178 A | | 3/1996 | Mohan | |
| 5,500,632 A | | 3/1996 | Halser, III | |
| 5,510,942 A | | 4/1996 | Bock et al. | |
| 5,530,307 A | | 6/1996 | Horst | |
| 5,533,658 A | | 7/1996 | Benedict et al. | |
| 5,534,754 A | | 7/1996 | Poumey | |
| 5,545,853 A | | 8/1996 | Hildreth | |
| 5,550,410 A | | 8/1996 | Titus | |
| 5,583,387 A | | 12/1996 | Takeuchi et al. | |
| 5,587,126 A | | 12/1996 | Steketee, Jr. | |
| 5,598,137 A | | 1/1997 | Alber et al. | |
| 5,607,320 A | | 3/1997 | Wright | |
| 5,612,510 A | | 3/1997 | Hildreth | |
| 5,663,605 A | | 9/1997 | Evans et al. | |
| 5,672,926 A | | 9/1997 | Brandes et al. | |
| 5,689,223 A | | 11/1997 | Demarmels et al. | |
| 5,807,447 A | | 9/1998 | Forrest | |
| 5,834,699 A | | 11/1998 | Buck et al. | |

FOREIGN PATENT DOCUMENTS

| | | | | |
|---|---|---|---|---|
| CH | 391071 | | 4/1965 | |
| CH | SU 266037 | | 10/1965 | |
| CH | 534448 | | 2/1973 | |
| CH | 539328 | | 7/1973 | |
| CH | SU 646403 | | 2/1979 | |
| CH | 657482 | | 8/1986 | |
| CH | SU 1189322 | | 10/1986 | |
| DE | 40414 | | 8/1887 | |
| DE | 277012 | | 7/1914 | |
| DE | 336418 | | 6/1920 | |
| DE | 372390 | | 3/1923 | |
| DE | 386561 | | 12/1923 | |
| DE | 387973 | | 1/1924 | |
| DE | 406371 | | 11/1924 | |
| DE | 425551 | | 2/1926 | |
| DE | 426793 | | 3/1926 | |
| DE | 432169 | | 7/1926 | |
| DE | 433749 | | 9/1926 | |
| DE | 435608 | | 10/1926 | |
| DE | 435609 | | 10/1926 | |
| DE | 441717 | | 3/1927 | |
| DE | 443011 | | 4/1927 | |
| DE | 460124 | | 5/1928 | |
| DE | 482506 | | 9/1929 | |
| DE | 501181 | | 7/1930 | |
| DE | 523047 | | 4/1931 | |
| DE | 568508 | | 1/1933 | |
| DE | 572030 | | 3/1933 | |
| DE | 584639 | | 9/1933 | |
| DE | 586121 | | 10/1933 | |
| DE | 604972 | | 11/1934 | |
| DE | 468847 | * | 2/1936 | 310/214 |
| DE | 629301 | | 4/1936 | |
| DE | 673545 | | 3/1939 | |
| DE | 719009 | | 3/1942 | |
| DE | 846583 | | 8/1952 | |
| DE | 875227 | | 4/1953 | |
| DE | 975999 | | 1/1963 | |
| DE | 1465719 | | 5/1969 | |
| DE | 1807391 | | 5/1970 | |
| DE | 2050674 | | 5/1971 | |
| DE | 1638176 | | 6/1971 | |
| DE | 2155371 | | 5/1973 | |
| DE | 2400698 | | 7/1975 | |
| DE | 2520511 | | 11/1976 | |
| DE | 2656389 | | 6/1978 | |
| DE | 2721905 | | 11/1978 | |
| DE | 137164 | | 8/1979 | |
| DE | 138840 | | 11/1979 | |
| DE | 2824951 | | 12/1979 | |
| DE | 2835386 | | 2/1980 | |
| DE | 2839517 | | 3/1980 | |
| DE | 2854520 | | 6/1980 | |
| DE | 3009102 | | 9/1980 | |
| DE | 2913697 | | 10/1980 | |
| DE | 2920478 | | 12/1980 | |
| DE | 3028777 | | 3/1981 | |
| DE | 2939004 | | 4/1981 | |
| DE | 3006382 | | 8/1981 | |
| DE | 3008818 | | 9/1981 | |
| DE | 209313 | | 4/1984 | |
| DE | 3305225 | | 8/1984 | |
| DE | 3309051 | | 9/1984 | |
| DE | 3441311 | | 5/1986 | |
| DE | 3543106 | | 6/1987 | |
| DE | 2917717 | | 8/1987 | |
| DE | 3612112 | | 10/1987 | |
| DE | 3726346 | | 2/1989 | |
| DE | 3925337 | | 2/1991 | |
| DE | 4023903 | | 11/1991 | |
| DE | 4022476 | | 1/1992 | |
| DE | 4233558 | | 3/1994 | |
| DE | 4402184 | | 8/1995 | |
| DE | 4409794 | | 8/1995 | |
| DE | 4412761 | | 10/1995 | |
| DE | 4420322 | | 12/1995 | |
| DE | 19620906 | | 1/1996 | |
| DE | 4438186 | | 5/1996 | |
| DE | 19020222 | | 3/1997 | |
| DE | 19547229 | | 6/1997 | |
| DE | 468827 | | 7/1997 | |
| DE | 134022 | | 12/2001 | |
| EP | 049104 | | 4/1982 | |
| EP | 0493704 | | 4/1982 | |
| EP | 0056580 A1 | | 7/1982 | |
| EP | 078908 | | 5/1983 | |
| EP | 0120154 | | 10/1984 | |
| EP | 0130124 | | 1/1985 | |
| EP | 0142813 | | 5/1985 | |
| EP | 0155405 | | 9/1985 | |
| EP | 0102513 | | 1/1986 | |
| EP | 0174783 | | 3/1986 | |
| EP | 0185788 | | 7/1986 | |

| | | | | |
|---|---|---|---|---|
| EP | 0277358 | | 8/1986 | |
| EP | 0234521 | | 9/1987 | |
| EP | 0244069 | | 11/1987 | |
| EP | 0246377 | | 11/1987 | |
| EP | 0265868 | | 5/1988 | |
| EP | 0274691 | | 7/1988 | |
| EP | 0280759 | | 9/1988 | |
| EP | 0282876 | | 9/1988 | |
| EP | 0309096 | | 3/1989 | |
| EP | 0314860 | | 5/1989 | |
| EP | 0316911 | | 5/1989 | |
| EP | 0317248 | | 5/1989 | |
| EP | 0335430 | | 10/1989 | |
| EP | 0342554 | | 11/1989 | |
| EP | 0221404 | | 5/1990 | |
| EP | 0375101 | | 6/1990 | |
| EP | 0406437 | | 1/1991 | |
| EP | 0439410 | | 7/1991 | |
| EP | 0440865 | | 8/1991 | |
| EP | 0469155 A1 | | 2/1992 | |
| EP | 0490705 | | 6/1992 | |
| EP | 0503817 | | 9/1992 | |
| EP | 0571155 | | 11/1993 | |
| EP | 0620570 | | 10/1994 | |
| EP | 0620630 | | 10/1994 | |
| EP | 0642027 | | 3/1995 | |
| EP | 0671632 | | 9/1995 | |
| EP | 0676777 | | 10/1995 | |
| EP | 0677915 | | 10/1995 | |
| EP | 0684679 | | 11/1995 | |
| EP | 0684682 | | 11/1995 | |
| EP | 0695019 | | 1/1996 | |
| EP | 0732787 | | 9/1996 | |
| EP | 0738034 | | 10/1996 | |
| EP | 0739087 A2 | | 10/1996 | |
| EP | 0740315 | | 10/1996 | |
| EP | 0749190 A2 | | 12/1996 | |
| EP | 0751605 | | 1/1997 | |
| EP | 0739087 A3 | | 3/1997 | |
| EP | 0749193 A3 | | 3/1997 | |
| EP | 0780926 | | 6/1997 | |
| EP | 0802542 | | 10/1997 | |
| EP | 0913912 A1 | | 5/1999 | |
| FR | 805544 | | 4/1936 | |
| FR | 841351 | | 1/1938 | |
| FR | 847899 | | 12/1938 | |
| FR | 916959 | | 12/1946 | |
| FR | 1011924 | | 4/1949 | |
| FR | 1126975 | | 3/1955 | |
| FR | 1238795 | | 7/1959 | |
| FR | 2108171 | | 5/1972 | |
| FR | 2251938 | | 6/1975 | |
| FR | 2305879 | | 10/1976 | |
| FR | 2376542 | | 7/1978 | |
| FR | 2467502 | | 4/1981 | |
| FR | 2481531 | | 10/1981 | |
| FR | 2556146 | * | 12/1983 | ................. 310/214 |
| FR | 2556146 | | 6/1985 | |
| FR | 2594271 | * | 2/1986 | ................. 310/214 |
| FR | 2594271 | | 8/1987 | |
| FR | 2708157 | | 1/1995 | |
| GB | 123906 | | 3/1919 | |
| GB | 268271 | | 3/1927 | |
| GB | 293861 | | 11/1928 | |
| GB | 292999 | | 4/1929 | |
| GB | 319313 | | 7/1929 | |
| GB | 518993 | | 3/1940 | |
| GB | 537609 | | 6/1941 | |
| GB | 540456 | | 10/1941 | |
| GB | 589071 | | 6/1947 | |
| GB | 666883 | | 2/1952 | |
| GB | 685416 | | 1/1953 | |
| GB | 702892 | | 1/1954 | |
| GB | 715226 | | 9/1954 | |
| GB | 723457 | | 2/1955 | |
| GB | 739962 | | 11/1955 | |
| GB | 763761 | | 12/1956 | |
| GB | 805721 | | 12/1958 | |
| GB | 827600 | | 2/1960 | |
| GB | 854728 | | 11/1960 | |
| GB | 870583 | | 6/1961 | |
| GB | 913386 | | 12/1962 | |
| GB | 965741 | | 8/1964 | |
| GB | 992249 | | 5/1965 | |
| GB | 1135242 | * | 9/1965 | ................. 310/214 |
| GB | 1024583 | | 3/1966 | |
| GB | 1053337 | | 12/1966 | |
| GB | 1059123 | | 2/1967 | |
| GB | 1103098 | | 2/1968 | |
| GB | 1103099 | | 2/1968 | |
| GB | 1117401 | | 6/1968 | |
| GB | 1135242 | | 12/1968 | |
| GB | 1147049 | | 4/1969 | |
| GB | 1157885 | | 7/1969 | |
| GB | 1174659 | | 12/1969 | |
| GB | 1236082 | | 6/1971 | |
| GB | 1268770 | | 3/1972 | |
| GB | 1319257 | | 6/1973 | |
| GB | 1322433 | | 7/1973 | |
| GB | 1340983 | | 12/1973 | |
| GB | 1341050 | | 12/1973 | |
| GB | 1365191 | | 8/1974 | |
| GB | 1395152 | | 5/1975 | |
| GB | 1424982 | | 2/1976 | |
| GB | 1426594 | | 3/1976 | |
| GB | 1438610 | | 6/1976 | |
| GB | 1445284 | | 8/1976 | |
| GB | 1479904 | | 7/1977 | |
| GB | 1493163 | | 11/1977 | |
| GB | 1502938 | | 3/1978 | |
| GB | 1525745 | | 9/1978 | |
| GB | 2000625 | | 1/1979 | |
| GB | 1548633 | | 7/1979 | |
| GB | 2046142 | | 11/1979 | |
| GB | 2022327 | | 12/1979 | |
| GB | 2025150 | | 1/1980 | |
| GB | 2034101 | | 5/1980 | |
| GB | 1574796 | | 9/1980 | |
| GB | 2070341 | | 9/1981 | |
| GB | 2070470 | | 9/1981 | |
| GB | 2071433 | | 9/1981 | |
| GB | 2081523 | | 2/1982 | |
| GB | 2099635 | | 12/1982 | |
| GB | 2105925 | | 3/1983 | |
| GB | 2106306 | | 4/1983 | |
| GB | 2106721 | | 4/1983 | |
| GB | 2136214 | | 9/1984 | |
| GB | 2140195 | | 11/1984 | |
| GB | 2150153 | | 6/1985 | |
| GB | 2268337 | | 1/1994 | |
| GB | 2273819 | | 6/1994 | |
| GB | 2283133 | | 4/1995 | |
| GB | 2289992 | | 12/1995 | |
| GB | 2308490 | | 6/1997 | |
| GB | 2332557 | | 6/1999 | |
| HU | 175494 | | 11/1981 | |
| JP | 60206121 | | 3/1959 | |
| JP | 57043529 | | 8/1980 | |
| JP | 57126117 | | 5/1982 | |
| JP | 59076156 | | 10/1982 | |
| JP | 59159642 | | 2/1983 | |
| JP | 6264964 | | 9/1985 | |

| | | |
|---|---|---|
| JP | 1129737 | 5/1989 |
| JP | 62320631 | 6/1989 |
| JP | 2017474 | 1/1990 |
| JP | 3245748 | 2/1990 |
| JP | 4179107 | 11/1990 |
| JP | 318253 | 1/1991 |
| JP | 424909 | 1/1992 |
| JP | 5290947 | 4/1992 |
| JP | 6196343 | 12/1992 |
| JP | 6233442 | 2/1993 |
| JP | 6325629 | 5/1993 |
| JP | 7057951 | 8/1993 |
| JP | 7264789 | 3/1994 |
| JP | 8167332 | 12/1994 |
| JP | 7161270 | 6/1995 |
| JP | 8264039 | 11/1995 |
| JP | 9200989 | 1/1996 |
| JP | 8036952 | 2/1996 |
| JP | 8167360 | 6/1996 |
| LU | 67199 | 3/1972 |
| SE | 90308 | 9/1937 |
| SE | 305899 | 11/1968 |
| SE | 255156 | 2/1969 |
| SE | 341428 | 12/1971 |
| SE | 453236 | 1/1982 |
| SE | 457792 | 6/1987 |
| SE | 502417 | 12/1993 |
| SU | 792302 | 1/1971 |
| SU | 425268 | 9/1974 |
| SU | 1019553 | 1/1980 |
| SU | 694939 | 1/1982 |
| SU | 955369 | 8/1983 |
| SU | 1511810 | 5/1987 |
| WO | WO8202617 | 8/1982 |
| WO | WO8502302 | 5/1985 |
| WO | WO9011389 | 10/1990 |
| WO | WO9012409 | 10/1990 |
| WO | PCT/DE 90/00279 | 11/1990 |
| WO | WO9101059 | 1/1991 |
| WO | WO9101585 | 2/1991 |
| WO | WO9107807 | 3/1991 |
| WO | PCT SE 91/00077 | 4/1991 |
| WO | WO9109442 | 6/1991 |
| WO | WO 91/11841 | 8/1991 |
| WO | WO8115862 | 10/1991 |
| WO | WO 91/15755 | 10/1991 |
| WO | WO9201328 | 1/1992 |
| WO | WO9203870 | 3/1992 |
| WO | WO9321681 | 10/1993 |
| WO | WO9406194 | 3/1994 |
| WO | WO9518058 | 7/1995 |
| WO | WO9522153 | 8/1995 |
| WO | WO9524049 | 9/1995 |
| WO | WO9622606 | 7/1996 |
| WO | WO9622607 | 7/1996 |
| WO | PCT/CN 96/00010 | 10/1996 |
| WO | WO9630144 | 10/1996 |
| WO | WO9710640 | 3/1997 |
| WO | WO9711831 | 4/1997 |
| WO | WO9716881 | 5/1997 |
| WO | WO 97/29494 | 8/1997 |
| WO | WO9745288 | 12/1997 |
| WO | WO9745847 | 12/1997 |
| WO | WO9745848 | 12/1997 |
| WO | WO9745906 | 12/1997 |
| WO | WO9745907 | 12/1997 |
| WO | WO 97/45908 | 12/1997 |
| WO | WO9745912 | 12/1997 |
| WO | WO9745914 | 12/1997 |
| WO | WO9745915 | 12/1997 |
| WO | WO9745916 | 12/1997 |
| WO | WO9745918 | 12/1997 |
| WO | WO9745919 | 12/1997 |
| WO | WO9745920 | 12/1997 |
| WO | WO9745921 | 12/1997 |
| WO | WO9745922 | 12/1997 |
| WO | WO9745923 | 12/1997 |
| WO | WO9745924 | 12/1997 |
| WO | WO9745925 | 12/1997 |
| WO | WO9745926 | 12/1997 |
| WO | WO9745927 | 12/1997 |
| WO | WO9745928 | 12/1997 |
| WO | WO9745929 | 12/1997 |
| WO | WO9745930 | 12/1997 |
| WO | WO9745931 | 12/1997 |
| WO | WO9745932 | 12/1997 |
| WO | WO9745933 | 12/1997 |
| WO | WO9745934 | 12/1997 |
| WO | WO9745935 | 12/1997 |
| WO | WO9745936 | 12/1997 |
| WO | WO9745937 | 12/1997 |
| WO | WO9745938 | 12/1997 |
| WO | WO9745939 | 12/1997 |
| WO | WO9747067 | 12/1997 |
| WO | WO9820595 | 5/1998 |
| WO | WO9820596 | 5/1998 |
| WO | WO9820597 | 5/1998 |
| WO | WO 98/20598 | 5/1998 |
| WO | WO9820600 | 5/1998 |
| WO | WO 98/20602 | 5/1998 |
| WO | WO9821385 | 5/1998 |
| WO | PCT/FR 98/00468 | 6/1998 |
| WO | WO9827634 | 6/1998 |
| WO | WO9827635 | 6/1998 |
| WO | WO9827636 | 6/1998 |
| WO | WO9829927 | 7/1998 |
| WO | WO9829928 | 7/1998 |
| WO | WO9829929 | 7/1998 |
| WO | WO9829930 | 7/1998 |
| WO | WO9829931 | 7/1998 |
| WO | WO9829932 | 7/1998 |
| WO | WO9833731 | 8/1998 |
| WO | WO9833736 | 8/1998 |
| WO | WO9833737 | 8/1998 |
| WO | WO9834238 | 8/1998 |
| WO | WO 98/34239 | 8/1998 |
| WO | WO9834240 | 8/1998 |
| WO | WO9834241 | 8/1998 |
| WO | WO9834242 | 8/1998 |
| WO | WO9834243 | 8/1998 |
| WO | WO9834244 | 8/1998 |
| WO | WO9834245 | 8/1998 |
| WO | WO9834246 | 8/1998 |
| WO | WO9834247 | 8/1998 |
| WO | WO9834248 | 8/1998 |
| WO | WO9834249 | 8/1998 |
| WO | WO9834250 | 8/1998 |
| WO | WO9834309 | 8/1998 |
| WO | WO9834312 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO 98/40627 | 9/1998 |
| WO | WO9834315 | 10/1998 |
| WO | WO 98/43336 | 10/1998 |

| | | |
|---|---|---|
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |
| WO | PCT/SE98/00151 | 8/1999 |
| WO | PCT/SE98/00152 | 8/1999 |
| WO | PCT/SE98/00162 | 8/1999 |
| WO | PCT/SE98/00163 | 8/1999 |
| WO | PCT/SE98/00164 | 8/1999 |
| WO | PCT/SE98/00165 | 8/1999 |
| WO | PCT/SE98/00166 | 8/1999 |
| WO | PCT/SE98/00167 | 8/1999 |
| WO | PCT/SE98/00168 | 8/1999 |
| WO | PCT/SE98/00169 | 8/1999 |
| WO | PCT/SE98/00170 | 8/1999 |
| WO | PCT/SE98/00171 | 8/1999 |
| WO | PCT/SE98/00174 | 8/1999 |
| WO | PCT/SE98/00175 | 8/1999 |
| WO | PCT/SE98/00176 | 8/1999 |
| WO | PCT/SE98/00179 | 8/1999 |
| WO | PCT/SE97/008 | 10/1999 |

OTHER PUBLICATIONS

Elkraft teknisk Handbok, 2 Elmaskiner; A. Alfredsson et al; 1988, pp 121–123.

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Blenick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design for the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub. 86, vol. 8, pp 25–31.

Hydroalternators of 110 to 220 kV Elektrotechn. Obz., vol. 64, No. 3, ppl32–136 Mar. 1975; A. Abramov.

Design Concepts for an Amorphous Metal Distribution Transformer; E. Boyd et al; IEEE Nov. 1984.

Neue Webe zum Bau zweipoliger Turbogeneratoren bis 2 GVA, 6OkV Elektrotechnik und Maschinenbau Wien Janner 1972, Heft 1, Seite 1–11; G. Alchholzer.

Optimizing designs of water–resistant magnet wire; V. Kuzenev et al; Elektrotekhnika, vol. 59, No. 12, pp35–40, 1988.

Zur Entwicklung der Tauchpumpenmotoren: A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen– ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Huemann; 1987.

High capacity synchronous generator having no tooth stator; V.S. Kildishev et al; No. 1, 1977 pp11–16.

Der Asynchronmotor als Antrieb stopfbcichsloser Pumpen; E. Picmous; Eletrochnik und Maschinenbay No. 78; pp 153–155, 1961.

Low core rotating flux transformer; R. F. Krause, et al; American Institute Physics J.Appl.Phys vol. 64 #10 Nov. 1988, pp5376–5378.

An EHV bulk Powr transmission line Made with Low Loss XLPE Cable;Ichihara et al; Aug. 1992; pp3–6.

Underground Transmission Systems Reference Book; 1992;pp16–19; pp36–45; pp67–81.

Power System Stability and Control; P. Kundur, 1994; pp23–25; p. 767.

Six phase Synchronous Machine with AC and DC Stator Connections, Part II: Harmonic Studies and a proposed Uninterruptible Power Supply Scheme; R.Schiferl et al.;Aug. 1983 pp 2694–2701.

Six phase Synchronous Machine with AC and DC Stator Connections; Part 1: Equivalent circuit representation and Steady–State Analysis; R. Schiferl et al; Aug. 1983; pp2685–2693.
Reactive Power Compensation; T. Petersson; 1993; pp 1–23.
Permanent Magnet Machines; K. Binns; 1987; pp 9–1 through 9–26.
Hochspannungsaniagen for Wechselstrom; 97. Hochspannungsaufgaben an Generatoren und Motoren; Roth et al; 1938; pp452–455.
Hochspannungsaniagen for Wechselstrom; 97. Hochspannungsaufgaben an Generatoren und Motoren; Roth et al; Spring 1959, pp30–33.
Neue Lbsungswege zum Entwurf grosser Turbogeneratoren bis 2GVA, 6OkV; G. Aicholzer; Sep. 1974, pp249–255.
Advanced Turbine–generators– an assessment; A. Appleton, et al; International Conf. Proceedings, Lg HV Elec. Sys. Paris, FR, Aug.–Sep./1976, vol. 1, Section 11–02, pg1–9
Fully slotless turbogenerators; E. Spooner; Proc., IEEE vol. 120 #12, Dec. 1973.
Toroidal winding geometry for high voltage superconducting alternators; J. Kirtley et al; MIT—Elec. Power Sys. Engrg. Lab for IEEE PES;Feb. 1974.
High–Voltage Stator Winding Development; D. Albright et al; Proj. Report EL339, Project 1716, Apr. 1984.
POWERFORMER ™: A giant step in power plant engineering; Owman et al; CIGRE 1998, Paper 11:1.1.
Thin Type DC/DC Converter using a coreless wire transformer; K. Onda et al; Proc. IEEE Power Electronic Spec. Conf.; Jun. 1994, pp330–334.
Development of extruded polymer insulated superconducting cable; Jan. 1992.
Transformer core losses; B. Richardson; Proc. IEEE May 1986, pp365–368.
Cloth–transformer with divided windings and tension annealed amorphous wire; T. Yammamoto et al; IEEE Translation Journal on Magnetics in Japan vol. 4, No. 9, Sep. 1989.
A study of equipment sizes and constraints for a unified power flow controller; J Bian et al; IEEE 1996.
U.S. Appl. No. 08/973,019, filed Nov. 28, 1997.
U.S. Appl. No. 08/973,210, filed Nov. 28, 1997.
U.S. Appl. No. 08/952,993, filed Nov. 28, 1997.
U.S. Appl. No. 08/952,990, filed Nov. 28, 1997.
U.S. Appl. No. 08/973,017, filed Nov. 28, 1997.
U.S. Appl. No. 08/973,018, filed Nov. 28, 1997.
U.S. Appl. No. 08/952,996, filed Nov. 28, 1997.
U.S. Appl. No. 08/952,995, filed Nov. 28, 1997.
U.S. Appl. No. 08/973,308, filed Nov. 28, 1997.
U.S. Appl. No. 08/973,307, filed Nov. 28, 1997.
U.S. Appl. No. 08/973.306, filed Nov. 28, 1997.
U.S. Appl. No. 08/973,305, filed Nov. 28, 1997.
U.S. Appl. No. 08/980,214, filed Nov. 28, 1997.
U.S. Appl. No. 08/980,213, filed Nov. 28, 1997.
U.S. Appl. No. 08/980,210, filed Nov. 28, 1997.
U.S. Appl. No. 09/161,992, filed Sep. 29, 1998.
U.S. Appl. No. 09/161,993, filed Sep. 29, 1998.
U.S. Appl. No. 09/194,577, filed Nov. 27, 1998.
U.S. Appl. No. 09/194,578, filed Nov. 27, 1998.
U.S. Appl. No. 09/194,562, filed Nov. 27, 1998.
U.S. Appl. No. 09/194,567, filed Nov. 27, 1998.
U.S. Appl. No. 09/194,564, filed Nov. 27, 1998.
U.S. Appl. No. 09/194,563, filed Nov. 27, 1998.
U.S. Appl. No. 09/194,568, filed Nov. 27, 1998.
U.S. Appl. No. 09/194,561, filed Nov. 27, 1998.
U.S. Appl. No. 09/194,579, filed Nov. 27, 1998.
U.S. Appl. No. 09/194,560, filed Nov. 27, 1998.
U.S. Appl. No. 09/194,566, filed Nov. 27, 1998.
U.S. Appl. No. 09/194,565, filed Nov. 27, 1998.
U.S. Appl. No. 09/297,608, filed May 4, 1999.
U.S. Appl. No. 09/297,606, filed May 4, 1999.
U.S. Appl. No. 09/297,605, filed May 4, 1999.
U.S. Appl. No. 09/297,607, filed May 4, 1999.
U.S. Appl. No. 09/297,609, filed May 4, 1999.
U.S. Appl. No. 09/331,120, filed Jun. 17, 1999.
U.S. Appl. No. 09/331,119, filed Jun. 17, 1999.
U.S. Appl. No. 09/509,466, filed Mar. 28, 2000.
U.S. Appl. No. 09/509,467, filed Mar. 28, 2000.
U.S. Appl. No. 09/509,438, filed Mar. 28, 2000.
U.S. Appl. No. 09/509,430, filed Mar. 28, 2000.
U.S. Appl. No. 09/509,428, filed Mar. 28, 2000.
U.S. Appl. No. 09/509,464, filed Mar. 28, 2000.
U.S. Appl. No. 09/509,465, filed Mar. 28, 2000.
U.S. Appl. No. 09/544,888, filed May 22, 2000.
U.S. Appl. No. 09/554,894, filed May 22, 2000.
U.S. Appl. No. 09/554,907, filed May 22, 2000.
U.S. Appl. No. 09/554,908, filed May 22, 2000.
U.S. Appl. No. 09/147,325, filed Feb. 17, 1999.
U.S. Appl. No. 09/147,324, filed Feb. 8, 1999.
U.S. Appl. No. 09/147,319, filed Feb. 9, 1999.
U.S. Appl. No. 09/147,320, filed Feb. 2, 1999.
U.S. Appl. No. 09/147,323, filed Mar. 2, 1999.
U.S. Appl. No. 09/147,318, filed Feb. 24, 1999.
U.S. Appl. No. 09/147,322, filed Feb. 17, 1999.
U.S. Appl. No. 09/147,321, filed Nov. 27, 1998.
U.S. Appl. No. 09/297,570, filed Jun. 24, 1999.
U.S. Appl. No. 09/297.631, filed Jul. 1, 1999.
U.S. Appl. No. 09/319,923, filed Jun. 17, 1999.
U.S. Appl. No. 09/319,924, filed Oct. 15, 1999.
U.S. Appl. No. 09/319,925, filed Oct. 14, 1999.
U.S. Appl. No. 09/319,922, filed Oct. 15, 1999.
U.S. Appl. No. 09/319,926, filed Oct. 15, 1999.
U.S. Appl. No. 09/319,921, filed Oct. 14, 1999.
U.S. Appl. No. 09/355,797, filed Nov. 1, 1999.
U.S. Appl. No. 09/355,855, filed Nov. 1, 1999.
U.S. Appl. No. 09/355,801, filed Oct. 14, 1999.
U.S. Appl. No. 09/355,795, filed Oct. 22, 1999.
U.S. Appl. No. 09/355,807, filed Oct. 25, 1999.
U.S. Appl. No. 09/355,856, filed Oct. 21, 1999.
U.S. Appl. No. 09/355,857, filed Oct. 26, 1999.
U.S. Appl. No. 09/355,805, filed Sep. 17, 1999.
U.S. Appl. No. 09/355,806, filed Oct. 26, 1999.
U.S. Appl. No. 09/355,794, filed Oct. 22, 1999.
U.S. Appl. No. 09/355,754, filed Oct. 25, 1999.
U.S. Appl. No. 09/355,854, filed Oct. 25, 1999.
U.S. Appl. No. 09/355,771, filed Oct. 25, 1999.
U.S. Appl. No. 09/355,726, filed Nov. 1, 1999.
U.S. Appl. No. 09/355,796, filed Aug. 3, 1999.
U.S. Appl. No. 09/508,684, filed Mar. 28, 2000.
U.S. Appl. No. 09/508,685, filed Mar. 28, 2000.
U.S. Appl. No. 09/508,687, filed Mar. 28, 2000.
U.S. Appl. No. 09/508,678, filed Jun. 6, 2000.
U.S. Appl. No. 09/508,688, filed Mar. 28, 2000.
U.S. Appl. No. 09/508,676, filed Mar. 28, 2000.
U.S. Appl. No. 09/508,679, filed Mar. 28, 2000.
U.S. Appl. No. 09/508,681, filed Mar. 28, 2000.
U.S. Appl. No. 09/508,677, filed Jun. 1, 2000.
U.S. Appl. No. 09/508,683, filed Mar. 28, 2000.

U.S. Appl. No. 09/508,682, filed May 25, 2000.
U.S. Appl. No. 09/508,689, filed Mar. 28, 2000.
U.S. Appl. No. 09/554,875, filed May 22, 2000.
U.S. Appl. No. 09/554,090, filed May 22, 2000.
U.S. Appl. No. 09/554,884, filed May 22, 2000.
U.S. Appl. No. 09/554,914, filed May 22, 2000.
U.S. Appl. No. 09/554,881, filed May 22, 2000.
U.S. Appl. No. 09/555,028, filed May 22, 2000.
U.S. Appl. No. 09/554,876, filed May 22, 2000.
U.S. Appl. No. 09/554,913, filed May 22, 2000.
U.S. Appl. No. 09/554,953, filed May 22, 2000.
U.S. Appl. No. 09/554,954, filed May 22, 2000.
U.S. Appl. No. 09/554,883, filed May 22, 2000.
U.S. Appl. No. 09/554,912, filed May 22, 2000.
U.S. Appl. No. 09/555,031, filed May 22, 2000.
U.S. Appl. No. 09/554,930, filed May 22, 2000.
U.S. Appl. No. 09/555,030, filed May 22, 2000.
U.S. Appl. No. 09/554,921, filed May 22, 2000.
U.S. Appl. No. 09/555,029, filed May 22, 2000.
U.S. Appl. No. 09/541,523.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Pow r Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* , 1970, pp 6–8.

J&P Transformer Book 11$^{th}$ Edition;A. C. Franklin et al; owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Pow r Cable; T. Shimonosono et al; IEEE Power Delivery; vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable T st Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Kn ight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A Cour' Springer Verlag, Germany, 1936, pp 586–598.

Insulation systems for superconducting transmission cables; O. Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen, der Elektrotechnik und Kerntechnik, 1960, pp 395.

Das Handbuch der Lokomotiven ( hungarian locomotive V40 1 ' D '); B. Hollingsworth et al; Pawlak Verlagsgesellschaft; 1933, pp. 254–255.

Synchronous machines with single or double 3–phase star–connected winding fed by 12–pulse load commutated Inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—In Theory and Practice; K. Thorborg; ISBN 0–86238–341–2, 1993, pp 1–13.

Regulating transformers in power systems– new concepts and applications; E. Wirth et al; ABB Review Apr. 1997, p 12–20.

Transforming transformers; S. Mehta et al; *IEEE Spectrum*, Jul. 1997, pp. 43–49.

A study of equipment sizes and constraints for a unified power flow controller; J. Blan et al; IEEE Transactions on Power Delivery; vol. 12, No. 3, Jul. 1997, pp. 1385–1391.

Industrial High Voltage; F.H. Kreuger; *Industrial High Voltage* 1991 vol. 1, pp. 113–117.

Hochspannungtechnik; A. Küchler; Hochspannungstechnik, VDI Verlag 1996, pp. 365–366, ISBN 3–18–401530–0 or 3–540–62070–2.

High Voltage Engineering; N.S. Naldu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE Industrial Electronics—Technology and Applications, 1996, pp. 356.

Properties of High Plymer Cement Mortar; M. Tamai et al; *Science & Technology in Japan*, No. 63; 1977, pp 6–14.

Weatherability of Polymer–Modified Mortars after Ten–Year Outdoor Exposure in Kortiyama and Sapporo; Y. Ohama et al; *Science & Technology in Japan* No. 63; 1977, pp 2 6–31.

SMC Powders Open New Magnetic Applications; M. Persson (Editor); *SMC Update* , vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882–1888.

Low–intensy laser–triggering of rail–gaps with magnesium–aerosol switching–gases; W. Frey; 11 th International Pulse Power Conference, 1997, Baltimore, USA Digest of Technical Papers, p. 322–327.

* cited by examiner

ROTATING ELECTRICAL MACHINE HAVING HIGH-VOLTAGE STATOR WINDING AND ELONGATED SUPPORT DEVICES SUPPORTING THE WINDING AND METHOD FOR MANUFACTURING THE SAME

BACKGROUND OF THE INVENTION

1. Field of the Invention:

The present invention relates to a rotating electric machine, e.g., synchronous machines, normal synchronous machines as well as dual-fed machines, applications in asynchronous static current converter cascades, outerpole machines and synchronous flow machines and a method for making the same.

2. Discussion of the Background:

In the present document the terms radial, axial and peripheral constitute indications of direction defined in relation to the stator of the machine unless expressly stated otherwise. The term cable lead-through refers in the document to each individual length of the cable extending through a slot.

The machine is intended primarily as a generator in a power station for generating electric power. The machine is intended for use with high voltages. High voltages shall be understood here to mean electric voltages in excess of 10 kV. A typical operating range for the machine according to the invention may be 36 to 800 kV.

Conventional machines have been designed for voltages in the range 6–30 kV and 30 kV has normally been considered to be an upper limit. This generally implies that a generator is to be connected to the power network via a transformer which steps up the voltage to the level of the power network, i.e. in the range of approximately 100–400 kV.

By using high-voltage insulated electric conductors, in the following termed cables, with solid insulation similar to that used in cables for transmitting electric power in the stator winding (e.g. PEX cables) the voltage of the machine may be increased to such levels that it may be connected directly to the power network without an intermediate transformer. PEX refers to Cross-linked polyethylene (XLPE).

This concept generally implies that the slots in which the cables are placed in the stator to be deeper than conventional technology (thicker insulation due to higher voltage and more turns in the winding) requires. This entails new problems with regard to cooling, vibrations and natural frequencies in the region of the coil end, teeth and winding.

Securing the cable in the slot is also a problem—the cable is to be inserted into the slot without its outer layer being damaged. The cable is subjected to currents having a frequency of 100 Hz which cause a tendency to vibrate and, besides manufacturing tolerances with regard to the outer diameter, its dimensions will also vary with variations in temperature (i.e. load variations).

Although the predominant technology when supplying current to a high-voltage network for transmission, subtransmission and distribution, involves inserting a transformer between the generator and the power network as mentioned in the introduction, it is known that attempts are being made to eliminate the transformer by generating the voltage directly at the level of the network. Such a generator is described in U.S. Pat. No. 4,429,244, U.S. Pat. No. 4,164,672 and U.S. Pat. No. 3,743,867.

The manufacture of coils for rotating machines is considered possible with good results up to a voltage range of 10–20 kV.

Attempts at developing a generator for voltages higher than this have been in progress for some time, as is evident from “Electrical World”, Oct. 15, 1932, pages 524–525, for instance. This article describes how a generator designed by Parson in 1929 was constructed for 33 kV. A generator in Langerbrugge, Belgium, is also described which produced a voltage of 36 kV. Although the article also speculates on the possibility of increasing the voltage levels, development of the concepts upon which these generators were based ceased. This was primarily due to deficiencies in the insulating system where several layers of varnish-impregnated mica foil and paper were used.

Certain attempts at lateral thinking in the design of synchronous generators are described in an article entitled “Water-and-oil-cooled Turbogenerator TVM-300” in J. Elektrotechnika, No. 1 1970, pages 6–8 of U.S. Pat. No. 4,429,244 “Stator of generator” and in Russian patent specification CCCP Patent 955369.

The water-and-oil-cooled synchronous machine as described in J. Elektrotechnika is intended for voltages up to 20 kV. The article describes a new insulation system consisting of oil/paper insulation whereby it is possible to immerse the stator completely in oil. The oil can then be used as coolant and simultaneously insulation. A dielectric oil-separating ring is provided at the internal surface of the core to prevent oil in the stator from leaking out towards the rotor. The stator winding is manufactured from conductors having an oval, hollow shape, provided with oil and paper insulation. The coil sides with the insulation are retained in the slots with rectangular cross section by way of wedges. Oil is used as coolant both in the hollow conductors and in cavities in the stator walls. However, such cooling systems necessitate a large number of connections for both oil and electricity at the coil ends. The thick insulation also results in increased radius of curvature of the conductors which in turn causes increased size at of the coil overhang.

The above-mentioned U.S. patent relates to the stator part of a synchronous machine comprising a magnetic core of laminated plate with trapezoid slots for the stator winding. The slots are stepped since the need for insulation of the stator winding decreases less in towards the rotor where the part of the winding located closest to the neutral point is situated. The stator part also includes dielectric oil-separating cylinders nearest the inner surface of the core. This part will increase the excitation requirement in comparison with a machine lacking this ring. The stator winding is manufactured from oil-saturated cables having the same diameter for each layer of the coil. The layers are separated from each other by way of spacers in the slots and secured with wedges. Characteristic of the winding is that it consists of two “half-windings” connected in series. One of the two half-windings is situated centrally inside an insulated sheath. The conductors of the stator winding are cooled by surrounding oil. A drawback with so much oil in the system is the risk of leakage and the extensive cleaning-up process required in the event of a fault condition. The parts of the insulating sheath located outside the slots have a cylindrical part and a conical screening electrode whose task it is to control the electrical field strength in the area where the cable leaves the plate.

It is evident from CCCP 955369 that in another attempt at increasing-the rated voltage of a synchronous machine, the oil-cooled stator winding consists of a conductor with insulation for medium-high voltage, having the same dimension for all layers. The conductor is placed in stator slots in the shape of circular, radially situated openings corresponding to the cross-sectional area of the conductor and space required for fixation and cooling. The various radially located layers of the winding are surrounded and fixed in insulating tubes. Insulating spacer elements fix the tubes in the stator slot. In view of the oil cooling, an inner dielectric ring is also required here to seal the oil coolant from the inner air gap. The construction illustrated has no stepping of the insulation or of the stator slots. The construction shows an extremely narrow, radial waist between the various stator slots, entailing a large slot leakage flow which greatly affects the excitation requirements of the machine.

In a report from the Electric Power Research Institute, EPRI, EL-3391, from April 1984 an exposition is given of the generator concept in which a higher voltage is achieved in an electric generator with the object of being able to connect such a generator to a power network without intermediate transformers. The report deems such a solution to offer satisfactory gains in efficiency and financial advantages. The main reason that in 1984 it was considered possible to start developing generators for direct connection to the power network was that by that time a superconducting rotor had been developed. The considerable excitation capacity of the superconducting field makes it possible to use air-gap windings with sufficient thickness to withstand the electric stresses.

By combining the construction of an excitation circuit, the most promising concept of the project, together with winding, a so-called "monolith cylinder armature", a concept in which two cylinders of conductors are enclosed in three cylinders of insulation and the whole structure is attached to an iron core without teeth, it was deemed that a rotating electric machine for high voltage could be directly connected to a power network. This solution implied that the main insulation has to be made sufficiently thick to withstand network-to-network and network-to-earth potentials. Besides it requiring a superconducting rotor, a clear drawback with the proposed solution is that it requires a very thick insulation, thus increasing the size of the machine. The coil ends must be insulated and cooled with oil or freones in order to direct the large electric fields in the ends. The whole machine is to be hermetically enclosed to prevent the liquid dielectric medium from absorbing moisture from the atmosphere.

It is also known, e.g. through FR 2 556 146, GB 1 135 242 and U.S. Pat. No. 3,392,779, to apply various types of support members for the windings in the slots of a rotating electric machine. These do not apply to machines having an insulation system designed specifically for high voltages, and therefore lack relevance for the present invention.

The present invention is related to the above-mentioned problems associated with avoiding damage to the surface of the cable caused by wear against the surface, resulting from vibration during operation.

The slot through which the cable is inserted is relatively uneven or rough since in practice it is extremely difficult to control the position of the plates sufficiently exactly to obtain a perfectly uniform surface. The rough surface has sharp edges which may shave off parts of the semiconductor layer surrounding the cable. This leads to corona and breakthrough at operating voltage.

When the cable is placed in the slot and adequately clamped there is no risk of damage during operation. Adequate clamping implies that forces exerted (primarily radially acting current forces with double main frequency) do not cause vibrations that cause wear on the semiconductor surface. The outer semiconductor is to thus be protected against mechanical damage even during operation.

During operation the cable is also subjected to thermal loading so that the cross-linked polyethylene material expands. The diameter of a 145 kV cross-linked polyethylene cable, for instance, increases by about 1.5 mm at an increase in temperature from 20 to 70° C. Space must therefore be allowed for this thermal expansion.

It is already known to arrange a tube filled with cured epoxy compound between the bundle of cables in a slot and a wedge arranged at the opening of the slot in order to compress the cables in radial direction out towards the bottom of the slot. The abutment of the cables against each other thus also provides certain fixation in lateral direction. However, such a solution is not possible when the cables are arranged separate from each other in the slot. Furthermore the position force in lateral direction is relatively limited and no adjustment to variations in diameter is achieved. This construction cannot therefore be used for high-voltage cables of the type under consideration for the machine according to the present invention.

SUMMARY OF THE INVENTION

Against this background an object of the present invention is to solve the problems of achieving a machine of the type under consideration so that the cable is not subjected to mechanical damage during operation as a result of vibrations, and which permits thermal expansion of the cable. Achieving this would enable the use of cables that do not have a mechanically protecting outer layer. In such a case the outer layer of the cable has a thin semiconductor material which is sensitive to mechanical damage.

According to a first aspect of the invention this problem has been solved by giving a machine of the type described herein.

The invention is in the first place intended for use with a high-voltage cable composed of an inner core having a plurality of strand parts, an inner semiconducting layer, an insulating layer situated outside this and an outer semiconducting layer situated outside the insulating layer, particularly in the order of magnitude of 20–200 mm in diameter and 40–3000 mm$^2$ in conducting area.

The application on such cables thus constitutes preferred embodiments of the invention.

The elongated pressure members running parallel with the cable lead-throughs secure the latter in the slots and their elasticity permits a ceratin degree of fluctuation in the diameter of the cable to be absorbed. An important prerequisite is hereby created for achieving a machine with high-voltage cables in the windings at a voltage level that permits direct connection to the power network without any intermediate transformer.

According to a particularly advantageous embodiment of the invention at least one of the two semi-conducting layers has the same coefficient of thermal expansion as the solid insulation so that defects, cracks and the like are avoided upon thermal movement in the winding.

According to a preferred embodiment of the invention of the support members include elongated pressure members.

The elongated pressure members running parallel with the cable parts secure the latter in the slots and the resilient members allow for the absorption of a certain degree of fluctuation in the diameter of the cable. An important prerequisite is hereby created for achieving a machine with high-voltage cables in the windings at a voltage level that permits direct connection to the power supply system without any intermediate transformer.

In an advantageous embodiment of the invention the pressure elements include a tube filled with a pressure-hardened material, preferably epoxy. An expedient and reliable type of pressure element is hereby obtained, which is simple to apply.

According to a preferred embodiment each pressure element is arranged to act simultaneously against two cable lead-throughs so that the number of pressure elements may be limited to approximately half the number of cable lead-throughs in each slot. The pressure elements are preferably arranged in waist parts of the slot, situated between a pair of cable lead-throughs, thus facilitating the use of a single pressure element for two cable lead-throughs. In this case it is advantageous to design the waist part with a constriction on only one side as to leave space for the pressure element on the opposite side.

According to a preferred embodiment the pressure members are arranged on the same side of the slot as the resilient members, which produces a simple embodiment. It is also advantageous for the pressure members and resilient members to be joined together, suitably as a pressure hose with resilient pads applied on its outer surface.

According to yet another preferred embodiment the support member consists of a corrugated sheath surrounding the cable.

Since the cable is surrounded by a corrugated sheath it will be firmly fixed in the stator slots, the tops of the corrugation abutting and supported by the slot walls. The vibrations are suppressed by way of clamping at the same time as the outer semi-conductor layer of the cable is protected from damaging contact with the laminations in the slot walls. The corrugations also allow space for thermal expansion of the cable.

In a preferred embodiment of the invention the corrugated sheath is in the form of a separate tubular corrugated sheath applied around the outer semiconductor layer of the cable. The tube may be made of insulating or electrically conducting plastic. The sheath thus constitutes a protection that screens the semiconductor layer from direct contact with the slot walls, thereby protecting it. The sheath is thus in contact with the depressions of the corrugations towards the semiconductor layer and the cable can expand in the undulating spaces formed between sheath and semiconductor layer.

In this preferred embodiment it is also advantageous to arrange the corrugations annularly or as a helix. It is also advantageous in this embodiment to arrange a casting compound between sheath and slot walls. The position of the sheath is thus fixed more securely, avoiding any risk of it being displaced. Favorable heat transfer is also obtained from the cable to surrounding parts and any cooling arrangements provided. These may advantageously be embedded in the casting compound as longitudinally running tubes.

In a preferred alternative embodiment of the invention the corrugated sheath surface is in the form of corrugations directly in the outer semiconductor layer of the cable. The semiconductor layer will then admittedly come into direct contact with the slot walls, but only at the tops of the corrugations. Since the outer semiconductor layer is limited on its inner side by a cylindrical surface, its thickness at the tops of the corrugations will be considerable so that any damage to the tops of the corrugations on the semiconductor layer as a result of the scratching or wear from the slot walls will not cause significant damage to the semiconductor layer.

In this alternative embodiment the corrugations preferably run in the longitudinal direction of the cable.

In another advantageous embodiment the pressure elements are in the form of a hose. An expedient and reliable type of support element is thus formed, which is also simple to apply.

According to a preferred variant of this embodiment, the hose is filled with a pressure fluid. This enables the elasticity and contact pressure to be easily adjusted to that required. The hose may either be closed, which has the advantage that no special mechanism is required to maintain the pressure, or the pressure medium in the hose may communicate with a pressure source, enabling the pressure to be regulated and reduced if necessary.

In another preferred embodiment the hose encloses a pressure medium in solid form, e.g. silicon rubber, an alternative that provides ease of manufacture, little risk of faults occurring and requires little maintenance. In this case, the pressure medium should preferably have a cavity running axially through it.

According to a preferred embodiment each support element is arranged to act simultaneously against two cable parts so that the number of support elements may be limited to approximately half the number of cable lead-throughs in each slot. The support elements are preferably arranged in waist parts of the slot, situated between a pair of cable lead-throughs, thus facilitating the use of a single support element for two cable lead-throughs. In this case it is advantageous to design the waist parts with a large constriction on only one side so as to leave space for the support element on the opposite side, which may have a shallower constriction or none at all, i.e. so that the narrow part is asymmetrical.

According to a preferred embodiment of the method according to the invention, pressure members can be conveniently arranged in the stator slots so that, owing to the hose being filled with pressure medium after it is in place, an economic manufacturing process is achieved with regard to this particular component of the machine.

It is advantageous to pull the hose through several times, forwards and backwards, thereby producing several pressure elements from the same hose which is jointly filled with pressure medium.

According to another preferred embodiment the cable is surrounded by a corrugated sheath before it is inserted into the slot.

This embodiment offers considerable advantages since the risk of the laminations shaving off vital parts of the outer semiconductor layer is eliminated since only the tops of the corrugations reach the slot walls.

In a preferred embodiment of the alternative just described, a separate, tubular corrugated sheath is applied around the cable before it is inserted into the slot.

In this embodiment the sheath is preferably fitted over the cable in the axial direction and a lubricant is used, thereby achieving simple application of the sheath onto the cable.

In an advantageous variant of this embodiment of the method the corrugations on the sheath are annular. When the sheath with the cable is inserted into the slot by pulling on the sheath, the annular corrugations cause the sheath to stretch in longitudinal direction at the same time as its largest diameter decreases, i.e. the tops of the corrugations move radially inwards. A clearance is thus obtained between the sheath and the slot wall which facilitates insertion. When the sheath is in place and tensile force is no longer applied, it returns to its original shape where the tops of the corrugations will be in contact with the slot wall and fix the cable firmly in place.

In an alternative embodiment of the method the corrugations run in the longitudinal direction of the cable. In a particularly preferred embodiment of this alternative the corrugations are produced directly in the outer semiconductor layer of the cable. The advantage is thus achieved that the need for separate elements is eliminated. It also means that the corrugations can be produced simply by manufacturing the cable in such a way that its outer semiconductor layer is extruded, which constitutes a preferred embodiment of this alternative.

The support element is preferably inserted axially, after the winding phase.

Since the support elements are inserted after the high-voltage cable has been wound they constitute no obstruction for passing the cable through the slot during the actual winding process, and the axial insertion can be carried out in a simple manner, several advantageous ways being feasible.

In a preferred embodiment of the method each support element is inserted in such a state that it can pass without obstruction through the cross-sectional profile formed in the available space between cable and slot wall. Once the support element is in place it is caused to expand transversely to the axial direction.

Since the support element is given its intended thicker extension only after insertion, enabling it to be inserted without obstruction, there is negligible friction during the insertion, which facilitates the process.

In a preferred variant of this invention the support element includes an outer, thin-walled elastic hose. If it is sufficiently thin and elastic it will be so slippery that it can easily be inserted as described above. The hose can then be filled with cold-hardening silicon rubber to assume its expanded state, in which case the hose should suitably contain an elongated body upon insertion. When the hose is thereafter filled with the hardening, elastic material, the space between body and hose will be filled and less filler is required.

Another preferred variant to achieve unimpeded insertion of the support element is for it to have a smaller cross-sectional profile than the cross-sectional profile of the available space so that there is a clearance upon insertion. It may be advantageous to subject the support element to an axial tensile force upon insertion so that its cross-sectional profile is reduced. Once in place, the tensile force is released so that the support element assumes its operating shape. This offers a simple method of application. Alternatively the cross-sectional profile of the support element may be forcibly deformed so that it can be passed though the space, whereupon the deformation is released when the element is in place. This also constitutes a simple and expedient method of application.

A third preferred variant for achieving unimpeded insertion is for the support element originally to have had a cross-sectional profile in unloaded state that is less than the cross-sectional profile of the space, and is in the form of a hose which, when it has been applied, is expanding by placing the hose under pressure, suitably by way of pressurized gas or liquid or by introducing a cold-hardening compound which is allowed to solidify.

BRIEF DESCRIPTION OF THF DRAWING

The invention will be explained in more detail in the following description of the advantageous embodiments, with reference to the accompanying drawings in which.

DESCRIPTION OF THE PREFERRED EMBODIMENTS

Figure 1:
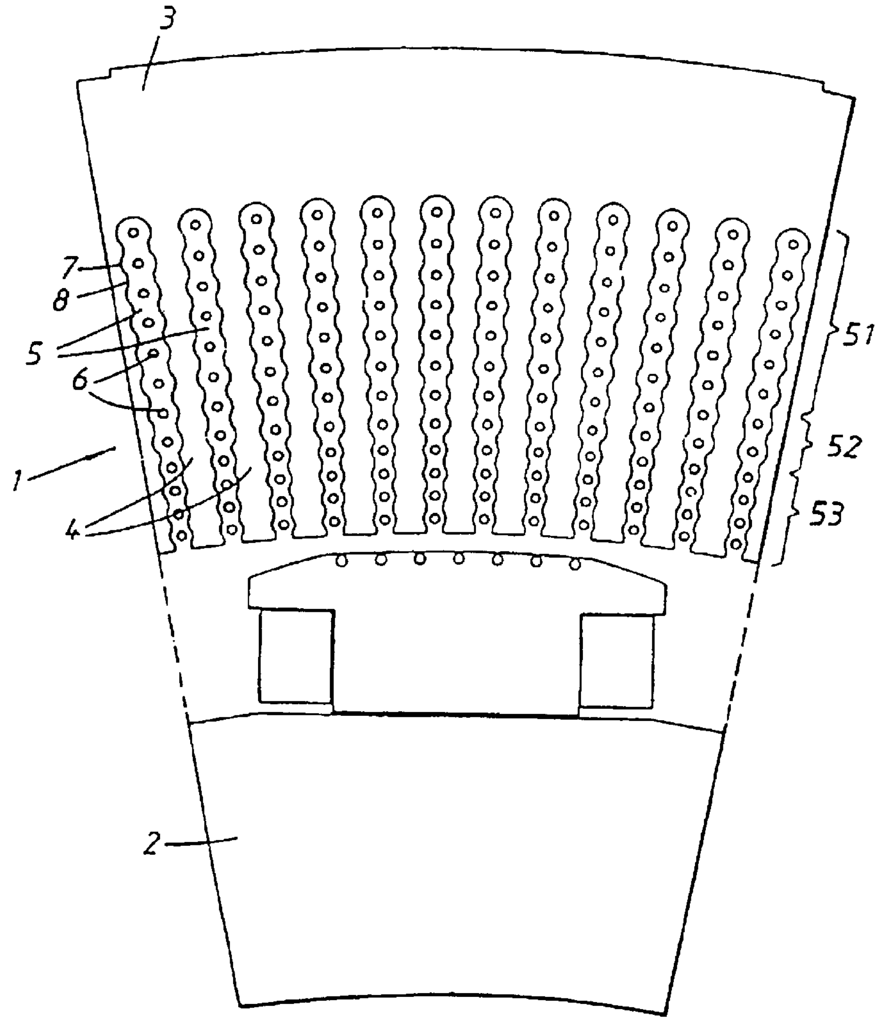
FIG. 1 shows schematically an axial end view of a sector of the stator in a machine according to the invention.

Referring now to the drawings, wherein like reference numerals designate identical or corresponding parts throughout the several views, and more particularly to FIG. 1, in the axial view shown schematically in FIG. 1 though a sector of the stator 1 of the machine, its rotor is designated 2. The stator is composed in conventional manner of a laminated core of sheet steel. FIG. 1 shows a sector of the machine, corresponding to one pole division. From a yoke portion 3 of the core situated radially outermost, a number of teeth 4 extend radially in toward the rotor 2 and are separated by slots 5 in which the stator winding is arranged. The cables 6 in the windings are high-voltage cables which may be of substantially the same type as high-voltage cables used for power distribution, so-called PEX cables. One difference is that the outer mechanically protective sheath that normally surrounds such a cable has been eliminated. The cable thus includes only the conductor, an inner semiconductor layer, an insulating layer and an outer semiconducting layer. The semiconductor layer, sensitive to mechanical damage, is thus exposed on the surface of the cable.

In the drawings the cables 6 are illustrated schematically, only the conducting central part of the cable lead-through or coil side being drawn in. As can be seen, each slot 5 has varying cross-section with alternative wide parts 7 and narrow parts 8. The wide parts 7 are substantially circular and surround cable lead-throughs and the waist parts between these form the narrow parts 8. The waist parts serve to radially position each cable lead-through. The cross-section of the slot as a whole also becomes slightly narrow in radial direction inwards. This is because the voltage in the cable lead-throughs is lower the closer they are situated to the radially inner part of the stator. Slimmer cable lead-through can therefore be used here, whereas increasingly coarser cable lead-throughs are required further out. In the example illustrated, cables of three different dimensions are used, arrange in three correspondingly dimensioned sections 51, 52, 53 of the slots 5.

Figure 2:
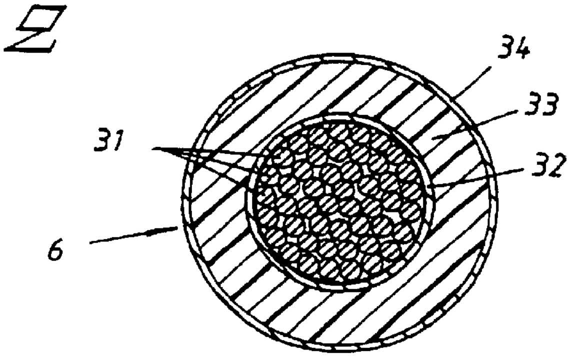
FIG. 2 shows a cross-section through a cable used in the machine according to the invention.

FIG. 2 shows a cross-sectional view of a high-voltage cable 6 according to the present invention. The high-voltage cable 6 includes a number of strand parts 31 made of copper (Cu), for instance and having a circular cross section. These strands parts 31 are arranged in the middle of the high voltage cable 6. Around the strand parts 31 is a first semiconducting layer 32. Around the first semiconducting layer 32 is an insulating layer 33, e.g. cross-lined polyethylene insulation. Around the insulating layer 33 is a second semi-conducting layer 34. The concept "high-voltage cable" in the present application thus need not include the metal screen and the outer protective sheath that normally surround such a cable for power distribution.

Figure 3:
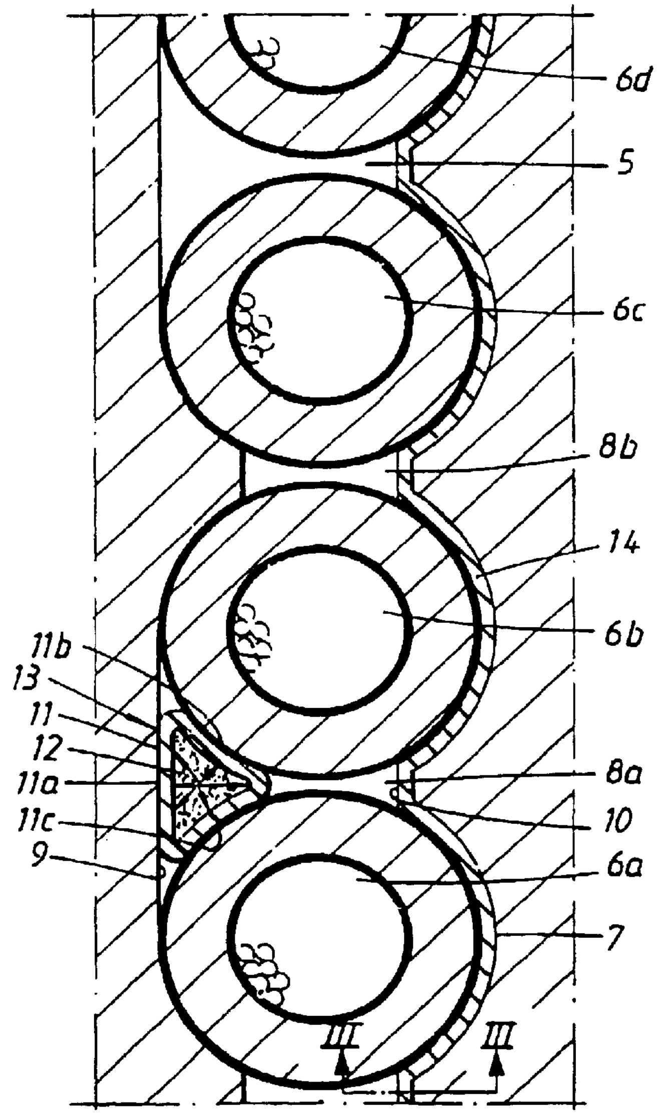
FIG. 3 shows schematically an axial partial section through a stator slot according to a first embodiment of the invention.

FIG. 3 shows an enlarged section through a part of a stator slot 5. The slot is of substantially the type shown in FIG. 1. One difference is that some of the waist parts 8, i.e. the narrow parts that separate the cable lead-throughs 6, are one-sided. Thus alternate narrower parts 8*b* have constrictions on both sides so that the narrow part is substantially symmetrical, and alternative narrower parts 8*a* have a constriction on only one side, the other side lying in the tangential plane 9 to adjacent arc-shaped wide parts. In longitudinal direction, therefore, the slot 5 will have parts having thee different widths; the wide circular parts 7, the single-sided waist parts 8*a* and the even narrower double-sided waist parts 8*b*. As in FIG. 1, the slot 5 is also composed of sections 51, 52, and 53 of different widths.

Figure 4:
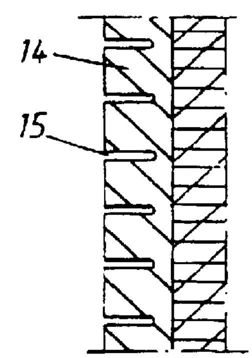
FIG. 4 is a section along the line III—III in FIG. 3.

The arrangement of the single-sided waist parts 8*a* provides extra space in the slot for pressure elements 13. The pressure element 13 illustrated in FIG. 4 as formed as a hose extending axially though the slots, i.e. parallel with the cable lead-throughs 6. The pressure element 13 is filled with pressure-hardened epoxy which presses the hose out towards adjacent surfaces, acquiring a shape conforming to these surfaces upon hardening. The epoxy is introduced at a pressure of approximately 1 MPa. The hose thus acquires a substantially triangular cross-section, with a first surface 11*a* supported by the slot wall, a second concave arc-shaped surface 11*b* abutting one of the adjacent cable lead-throughs 6*b* and a third surface 11*c* having the same shape as the second but abutting another of the adjacent cable lead-throughs 6*a*. Arranged in this manner, the pressure element 13 simultaneously presses the two cable lead-throughs 6*a* and 6*b* against the opposite slot all with a force on each cable lead-through 6*a*, 6*b* that is directed substantially towards its center.

A sheet 14 of rubber or other material having equivalent elastic properties is arranged on the opposite slot wall. Each cable lead-through will thus be resiliently clamped between the pressure element 13 and the rubber sheet 14 so that it is fixed in its position but so that the thermal expansion of the cable can also be accommodated. As can be seen in the enlarged section through it shown in FIG. 4, the rubber sheet 14 is suitably provided with slots 15 enabling optional adjustment of the spring constant in the sheet by a suitable selection of depth, breadth, and pitch thereof.

Figure 5:
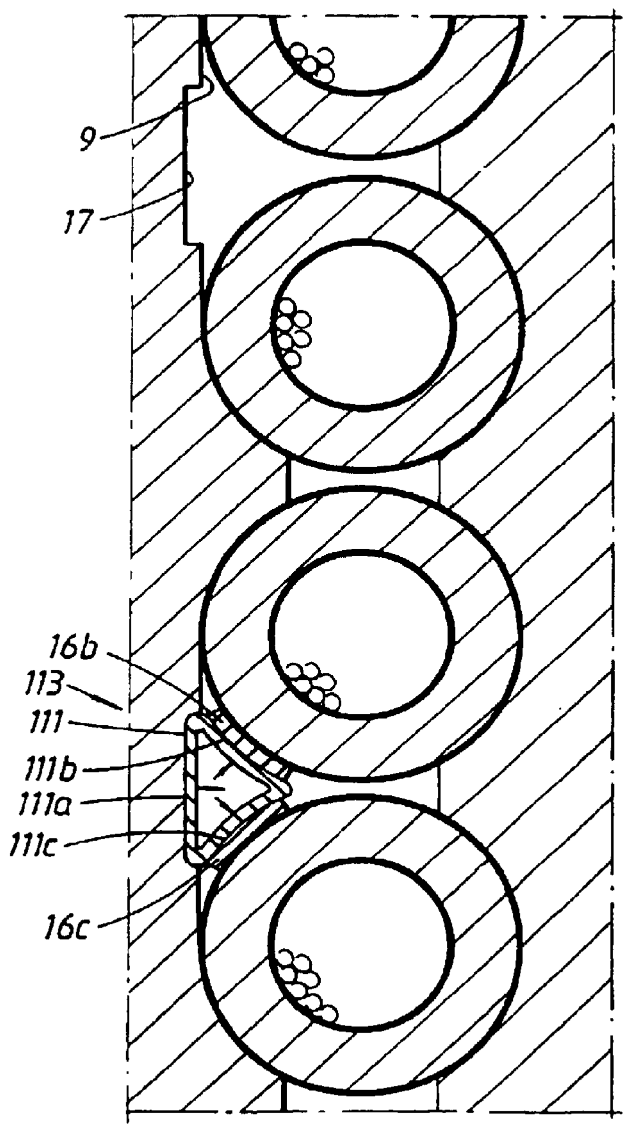
FIG. 5 is a section corresponding to that in FIG. 3, but illustrating a second embodiment of the invention.
Figure 5A:
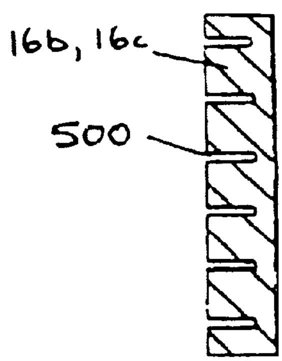
FIG. 5A is a detail view of a pad shown in FIG. 5, but illustrating an alternative embodiment of the pad.

FIG. 5 shows an alternative embodiment of the invention, modified from that according to FIG. 2 substantially in that the rubber sheet 14 has been replaced with rubber pads 16*b*, 16*c*, arranged in the form of flat rubber strips along the surfaces 111*b*, 111*c* of the pressure element 113 facing the cable lead-throughs. These rubber pads provide the necessary elasticity in the positioning and eliminate the need for a rubber sheet on the opposite side. Another difference is that a longitudinal recess 17 is provided in axial direction in the wall of the slot 5 at the points where the pressure elements 113 are arranged. This affords more space for the pressure elements 113 and also supports them in the radial direction. In an alternative embodiment, the rubber pads 16*b*, 16*c* have slots 500 formed therein, as shown in FIG. 5A.

Figure 6:
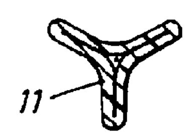
FIG. 6 shows a detail of FIG. 3 prior to assembly.
Figure 7:
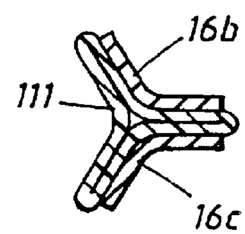
FIG. 7 shows in equivalent manner to FIG. 6, a detail from FIG. 5.

The pressure elements 13, 113 are inserted into the slots after the stator cables have been wound. The hose 11, 111 for the pressure elements 13, 113 is then inserted axially into the substantially triangular space between a pair of cable lead-throughs and the tangential wall part 9. At this stage the hose is not yet filled with epoxy and therefore has a collapsed shape as illustrated in FIGS. 6 and 7 for respective embodiments. It is thus easy to pull the hose through the available space. When the hose is in place it is filled with epoxy so that its cross section expands and substantially fills the triangular gap. Epoxy is introduced under sufficient pressure to press respective cable lead-throughs 6*a*, 6*b* with the desired force against the opposite wall of the slot. The pressurized epoxy is allowed to harden at this pressure to maintain a constant pressure on the cable lead-throughs.

A single hose 11, 111 can be pulled repeatedly forwards and backwards through the slot 5 so that the various pressure elements forming the pressure members of a slot are formed out of a single long hose upon application, the hose then being filled with epoxy as described above. When the epoxy has hardened properly, the arc-shaped hose parts formed outside each end plane of the stator can be cut away and removed.

The rubber sheet in the example shown need not necessarily be arranged in the part of the slot opposite to the pressure element. Instead it may be arranged on the same side. Neither need the resilient element in the embodiment according to FIG. 2 be in the form of a sheet, but may in the form of a strip as in the embodiment according to FIG. 5.

Instead of using a material such as epoxy which is hardened under pressure, the hose may be filled with a pressure fluid in gaseous or liquid form. In this case the tube itself acquires elastic properties and will function both as a pressure element and as a resilient member. The rubber sheet/strips are not needed in such an embodiment.

Figure 8:
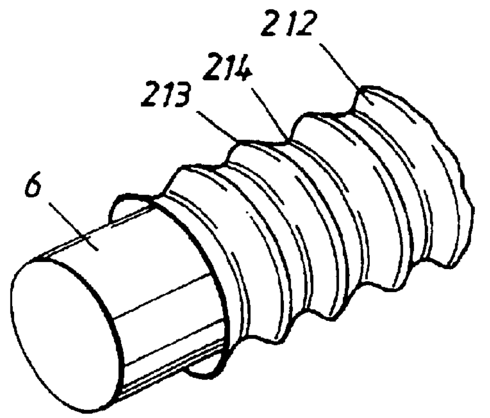
FIG. 8 shows a view in perspective of a cable with sheath according to a third embodiment of the invention.

FIG. 8 shows a perspective view of the cable 6 surrounded by a sheath 212 according to a third embodiment of the invention. The sheath 212 has annular ridges with tops 213 and annular depressions 214 between the tops.

Figure 9:
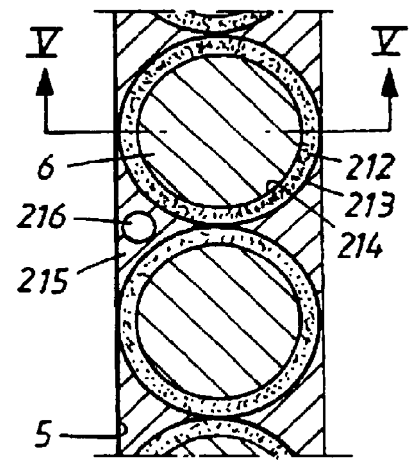
FIG. 9 shows a radial partial section through a slot in a stator in the embodiment according to FIG. 8.

FIG. 9 shows a part of a stator slot in a radial section though the embodiment according to FIG. 8. In the embodiment illustrated the slot does not have the shape of a bicycle chain as shown in FIG. 1 but instead has slot walls that are substantially flat in radial direction. Each cable part 6 is surrounded by a sheath 212 of the type shown in FIG. 8. The section is taken through one of the annular corrugation tops 213, i.e. when the sheath extends out to the slot wall. The annular depression 214 behind is in contact with the cable 6. The space between the cables 6 is filled with a casting compound 215. This also fills out the space between the ridges, as is symbolized by the dotted area in the figure. The sheath 212 is a plastic tube of insulated or electrically conducting plastic, and the casting compound is a suitable casting resin, epoxy. Cooling tubes 216 may be arranged in the casting compound in the triangular spaces formed between the cables. The cooling tubes may be of stainless steel or plastic, e.g. HD-PEX.

The difference between the outer and inner diameter of the corrugated sheath 212 is suited to the thermal expansion of the cable, normally about 3–4 mm. The wave depth, i.e. the distance between a depression 214 and a top 213 (d in FIG. 5) is thus about 1.5–2 mm.

Figure 10:
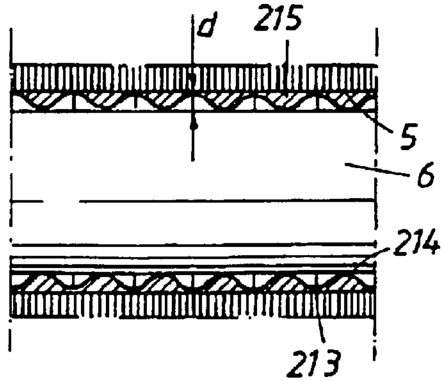
FIG. 10 is a section along the line V—V in FIG. 9.

The cable 6 with sheath is shown in an axial section in FIG. 10, the upper half of the figure illustrating the cable as it appears before the machine has been in operation so that the cable has a cylindrical sheath surface.

When the machine is in operation the thermal expansion causes the outer shape of the cable 6 to adjust to the shape of the ribbed sheath 212 since expansion occurs only in the spaces formed between the depressions 214. This is illustrated in the lower part of FIG. 10 where the cable fills out the sheath and follows its contours. Since these spaces must be able to take up the entire expansion, the depth of the depressions must naturally be corresponding greater than the increase in diameter the cable would have if it had been able to expand uniformly in longitudinal direction.

The fact that the space outside the sheath is filled out during operation assures the heat transfer from the cable to the surroundings. When the cable cools down during an interruption in operation it will to a certain extent retain its profiled outer surface.

When the stator is wound at manufacture the sheath 212 is first fitted onto the cable 6. A water-based lubricant such as a 1% polyacrylamide may be used. The cable is then passed though the slot 5 by pulling on the sheath. The corrugations cause the sheath 212 to stretch and it is thus compressed in the radial direction so that its outer diameter is decreased. A clearance is thus obtained through the wall of the slot 5, thereby facilitating insertion. Once in place, when the tensile force is no longer applied, the sheath expands so that its ridges 213 lie in contact with the slot wall as shown in FIGS. 9 and 10.

Another method is to thread the sheath 212 into the slot 5 by pulling on the sheath. The corrugations then cause the sheath to stretch and it is thus compresses in radial direction so that its outer diameter is decreased. A clearance is thus obtained in relation to the wall of the slot 5, thereby facilitating insertion. Once in place, when the tensile force is no longer applied, the sheath expands so that its ridges 213 lie in contact with the slot wall as shown in FIGS. 9 and 10.

The cable is then drawn into the sheath which is positioned, possibly using a water-based lubricant such as 1% acrylamide.

The casting compound 215 is then introduced into the spaces outside the sheath and this is secured to the slot walls by the casting compound. The longitudinal cooling tubes 216 may be embedded in the casting compounds at the same time. The casting compound 215 transfers the heat from the cable to the surroundings and/or the cooling tubes 216. Casting the sheath in this way also ensures that it is positioned in axial direction and, thanks to its corrugated shape the cable is axially secured in the sheath. The cable is thus firmly held in the slot even if the machine is oriented with a vertical axis.

Figure 11:
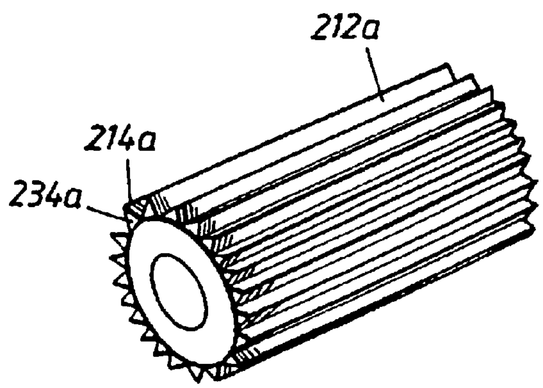
FIG. 11 is a view in perspective of a cable according to a fourth embodiment of the invention.

FIG. 11 shows an alternative arrangement of the corrugations on the cable surrounding the sheath surface. This differs from the embodiments described earlier primarily in that the corrugations are produced directly in the outer semiconducting layer 234*a* of the cable 6. The outer semiconductor layer consists of an ethylene copolymer with soot particles embedded in the material in a quantity dictated by the conductivity aimed at in the layer. In conventional semiconductor layers, i.e. with cylindrical outer surface, the layer is normally thicker than about 1 mm. In the embodiment shown in FIG. 11, it has thickness in the depressions that is less than the "normal" thickness and a thickness in the tops that exceeds the normal thickness. With a reference thickness of 1 mm, for instance, of a circular layer, the corresponding corrugated layer has a thickness of 0.5 mm in the depressions and 1.5 mm in the tops.

The cable illustrated in FIG. 11 thus lies in the slot with direct contact between the tops 14*a* of the corrugations and the slot wall. Since the semiconductor layer is thicker there, a ceratin amount of damage can be tolerated to the semiconductor layer to those parts upon insertion of the cable and as a result of vibration during operation, without injurious consequences. Furthermore, the contact between cable and tops 14*a* also provides a certain stabilization so that the problem of vibration is reduced.

During operation the thermal expansion of the cable will result in the cable expanding only in the free spaces between the corrugations, and these free spaces will be substantially filled by the semiconductor material. The expansion force will also cause the contact pressure at the tops to increase and the clamping action to be intensified. The material of the semiconductor layer is deformed substantially elastically at temperatures around 20° C., whereas at high temperatures from about 70° C. and upwards the deformation will be increasingly plastic. When the cable cools down at an interruption in operation, therefore, its outer semiconductor layer will retain a ceratin deformation, thereby having less height at the corrugations.

In the embodiment according to FIGS. 8–10, where the corrugations are arranged on a separate sheath, they may of course be arranged longitudinally instead, and in the embodiment according to FIG. 11 the corrugations may be annular instead of longitudinal.

In both cases the corrugations may have some other appearance, e.g. helical. The corrugations may also run in two dimensions. The profile of the corrugations may be sinus-shaped as in FIGS. 8–10 or may have sharp edges as in FIG. 11, regardless of the direction they run in and regardless of whether they are arranged on a separate sheath or directly in the outer semiconductor layer.

The corrugated sheath surface may also be formed using separate elements, e.g. longitudinal rods of polyamide arranged along the cable and distributed around its periphery.

These rods together with the outer semiconducting layer then forms a corrugated sheath surface in which the tops are formed by the rods and the depressions by the surface of the semiconductor layer.

The embodiment with corrugated sheath surface is suitable for slots with arbitrary profile of the slot walls, radially flat walls in FIG. 9, corrugated walls as in FIG. 1, or some other suitable shape.

Figure 12:
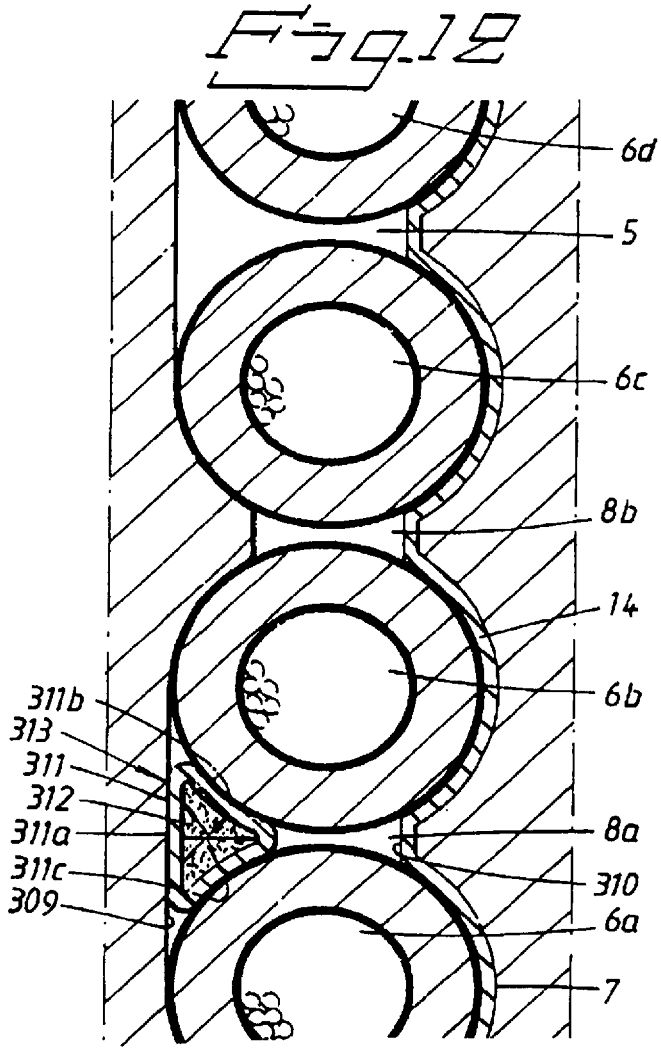
FIG. 12 is a radial partial section of a slot according to a fifth embodiment of the invention.

FIG. 12 shows an enlarged section through a part of a stator slot 5. The slot is of substantially the same type shown in FIG. 1. One difference is that some of the waist parts 8, i.e. the narrower parts that separate the cable lead-throughs 6, are one-sided. Thus alternate narrower parts 8*b* have constrictions on both sides so that the narrow part is substantially symmetrical, and alternate narrower parts 8*a* have a constriction on only one side, the other side lying in the tangential plane 9 to adjacent arc-shaped wide parts. In the longitudinal direction, therefore, the slot 5 will comprise parts having three different widths; the wide circular parts 7, the single-sided waist parts 8*a* and the even narrower double-sided waist parts 8*b*. As in FIG. 1, the slot 5 is also composed of sections 51, 52, 53 of different widths.

The arrangement of the single-sided waist parts 8*a* provides extra space in the slot for pressure elements 313. The pressure element 313 illustrated in the figure consists of a hose extending easily through the slots, i.e., parallel with the cable lead-throughs 6. The pressure element 313 is filled with pressure-hardened silicon or urethane rubber 312 which presses the hose out towards adjacent surface, acquiring a shape conforming to these surfaces upon hardening. The hose thus acquires a substantially triangular cross-section, with a first surface 11*a* supporting the slot wall, a second concave arc-shaped surface 311*b* abutting one of the adjacent cable lead-throughs 6*b* and a third surface 311*c* having the same shape as the second but abutting another of the adjacent cable lead-throughs 6*a*. Arranged in this manner, the pressure element 313 simultaneously presses the two cable lead-throughs 6*a* and 6*b* against the opposite slot wall with a force on each cable lead-through 6*a*, 6*b* that is directed substantially towards its center.

A sheet 310 of rubber or similar material is arranged on the opposite slot wall in the example shown.

The sheet 310 is applied to absorb a part of the thermal expansion. However, the element 313 may be adapted to enable absorption of all the thermal expansion, in which case the sheet 310 is omitted.

Figure 13:
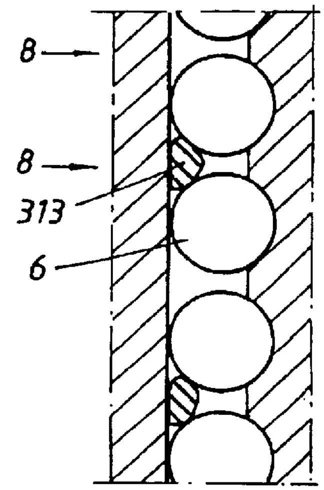
FIGS. 13–15 are sections corresponding to FIG. 12 according to alternative embodiments of the invention.
Figure 14:
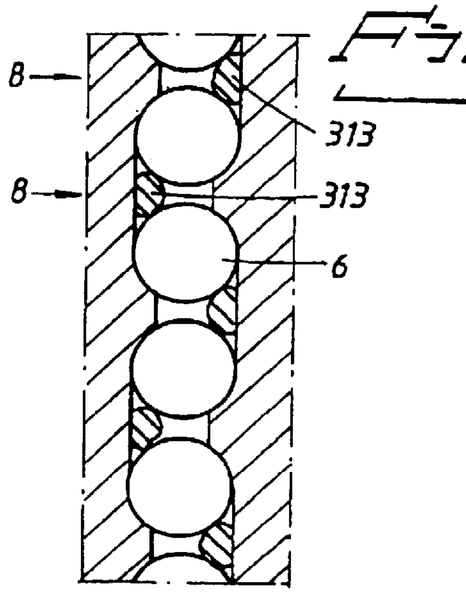
Figure 15:
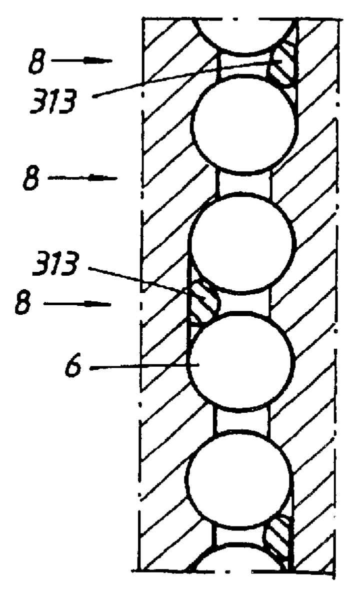

Several different variants for the slot profile are applicable besides those illustrated in FIGS. 1 and 12. A few examples are illustrated in FIGS. 13–15, where FIG. 13 shows a slot shape in which the narrow parts 8 are one-sided, i.e. one side of the slot is completely flat, whereas the other protrudes into every waist part. Support elements 313 are arranged at alternative narrow parts 8. Alternatively support elements may be arranged in every narrow part 8. All support elements 313 are situated close to the flat slot wall.

In FIG. 14 every narrow part 8 is similarly one-sided, i.e. formed by a flat part of one slot wall constituting a tangent to adjacent wide parts on the other side of a protruding wall section, the flat and protruding parts being situated alternately on each side of the slot. The support elements 313 are situated at each tangent plane part of the wall.

In FIG. 15 alternate narrow parts 8 are double-sided, i.e. with protruding wall sections on both sides of the slot, whereas alternate narrow parts are single-sided with one wall part constituting a tangent plane, their positions alternating between the two sides of the slot. The support elements 313 are situated at the tangent plane parts.

Figure 16:
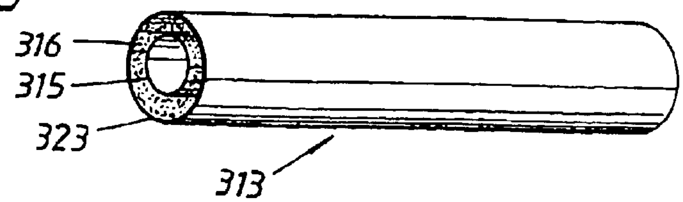
FIG. 16 is a view in perspective of a support element according to one embodiment of the invention.

FIG. 16 illustrates an embodiment of the support element 313 consisting of a thin-walled outer hose 323 and a thin-walled inner hose 315, both of rubber or some other elastic material. The hoses have such thin walls that they are easily deformed, becoming slippery and easily inserted axially into the elongated space between cable and slot wall.

When the hoses 323, 315 are in place, the space between them is filled with a curable elastic rubber material, e.g. silicon rubber 316, below which the inner hose 315 is kept filled with compressed air. When the silicon rubber 316 has solidified a thin-walled hose is obtained which presses against cable and slot wall and which has a certain elasticity in order to absorb thermal expansion of the cable. The inner hose 315 may be concentric with the outer hose, but is suitably eccentrically situated. When the element 313 is expanded by being filled with silicon rubber, it will adapt to the cross-sectional shape of the available space, becoming a rounded-off triangular shape as shown in FIGS. 12–15. The cavity formed by the inner hose contributes to increasing the elasticity of the support element 313 which, if it were completely filled with silicon rubber, would not be sufficiently compressible. The inner hose 315 may either remain after the space has been filled and the material hardened, or it may be pulled out.

Figure 17:
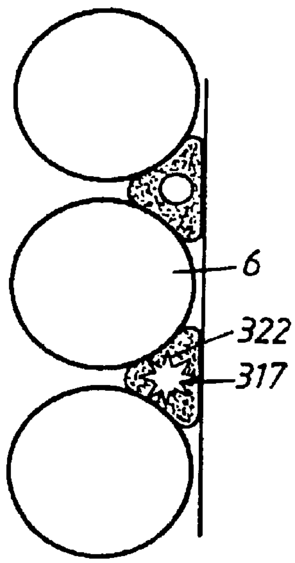
FIGS. 17 and 18 are sections corresponding to FIG. 12 illustrating additional alternative embodiments of the invention.

FIG. 17 shows two embodiments of the support element 313 in which the upper alternative corresponds to the support element applied as described with reference to FIG. 16.

The lower part of FIG. 17 illustrates another embodiment in which, upon application, the inner hose is replaced with a rod-shaped filler profile 317. The support element is formed in similar manner to the embodiment according to FIG. 16 but with the difference that the outer thin-walled hose is inserted enclosing the filler profile 317 instead of the inner thin-walled hose. After that the silicon rubber has been sprayed into the space between the hose and the surrounding thin-walled hose and has hardened, the filler profile 317 is pulled out of the support element so that a space of corresponding shape is formed. The filler profile 317 may have a suitable profile and be provided, for instance, with longitudinal grooves 322 in order to orientating the space optimally and achieve the desired elasticity. The filler profile 317 is suitably surface-treated to facilitate its removal.

Figure 18:
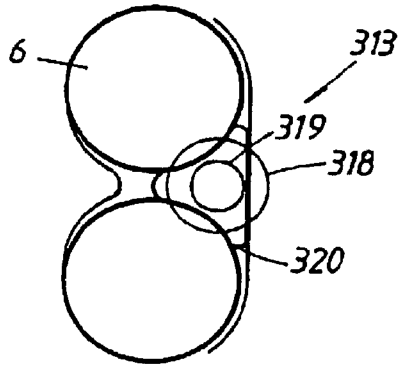

FIG. 18 illustrates yet another method of applying the support element 313 in the space between cable and slot wall. The element here includes a round rubber rod with a diameter in unloaded state that is greater than can be inserted into the cross-section of the available space. Its unloaded shape is illustrated by the circle 318. To enable insertion of the rod, it is pulled out in longitudinal direction so that its cross-sectional area decreases to the equivalent of the circle 319. It can then be pulled though the available space. When it is in place the tensile stress is removed so that it contracts axially and expands in cross-sectional direction. It will then contact the slot wall and adjacent cable parts with a compressive force and assume the triangular cross-sectional shape designated 320.

Figure 19:
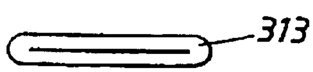
FIGS. 19–21 show cross-sections though the support element according to additional alternative embodiments of the invention.
Figure 20:
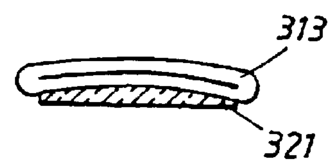
Figure 21:

FIGS. 19–21 illustrate another embodiment showing how the support element 313 may be applied, where upon insertion the support elements is forced to assume such a cross-sectional shape that is may be inserted without obstruction into the available space.

In FIG. 19 the support element consists of a hose which is placed under vacuum suction so that is acquires the flat shape shown in the figure, and is then sealed. When the hose is in place, air is allowed in by cutting off the ends of the hose so that is expands to abutment with cable and slot wall. The thickness of the hose is chosen so that its inherent cross-sectional rigidity when the hose is no longer vacuum-scaled, is designed to achieve sufficient pressure and permit thermal expansion of the cable.

In FIG. 20 a hose similar to the one in FIG. 19 is glued flat against a flat strip 321, e.g. of glassfibre laminate, with a brittle glue. When the flat hose has been inserted, compressed air is blown in so that the brittle glue snaps and the hose assumes a shape in wich it abuts slot wall and cable.

Alternatively, as illustrated in FIG. 21, glue is inserted into the hose which is then rolled flat so that it is glued in a state equivalent to that shown in FIG. 19. When in place, compressed air is blown into the hose so that the glue joint is broken. The hose containing glue may alternatively be rolled to a different shape, e.g. to the shape shown in FIG. 21.

The forcibly flattened shape of the support element upon insertion, as illustrated in FIGS. 19–22, means that in this embodiment it is also possible to insert it before the cable is wound, in which case the flat shape is retained until the cable lead-throughs are in place.

The embodiments shown in FIGS. 19–21 are based on the thickness of the tube being sufficient, once the forcible deformation has been released, for its inherent spring action to provide suitably resilient pressure against the cable lead-throughs.

In yet another alternative embodiment the walls of the hose can be made thinner than shown in FIG. 19, in which case it is under vacuum during insertion and will expand when the hose is in place and the vacuum is released. In this embodiment the hose is subsequently filled with a pressure medium to give it sufficient contact pressure. This medium may be air or liquid, e.g. water. The function of the support element is thus reversible since this pressure can be relieved. Alternatively, the hose may be filled with a cold-hardening medium such as silicon rubber, in which case the pressure will be permanent.

Figure 22:
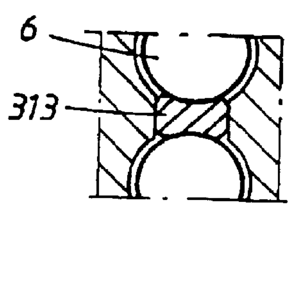
FIG. 22 is a section corresponding to FIG. 12 illustrating yet another embodiment of the invention.

In the latter embodiment the support element is place asymmetrically in the slot. A symmetrical arrangement as illustrated in FIG. 22, in which each support element 313 is placed mid-way between two cable lead-throughs, is also within the scope of the invention.

What is claimed is:

1. A rotating electric machine configured to operate at high-voltages comprising:

a stator having, a first slot, a second slot, and a third slot;

a stator winding of a high-voltage cable drawn though said first slot, said second slot, and said third slot of said stator, said high-voltage cable having an insulation system including a first semiconducting layer, a solid insulation layer arranged to surround and be in electrical contact with said first semiconducting layer, and a second semiconducting layer arranged to surround and be in contact with said solid insulation layer, said second semiconductor layer being formed from an extruded material that is configured to protect said stator winding from being damaged when drawn through said first slot, said second slot, and said third slot; and a support member positioned in contact with said stator winding, wherein said first semiconducting layer and said second semiconducting layer are configured to provide respective equipotential surfaces.

2. The machine of claim 1, wherein:

at least one of said first semiconducting layer and said second semiconducting layer has a same coefficient of thermal expansion as the solid insulation layer.

3. The machine of claim 1, wherein:

at least one of said first slot, said second slot, and said third slot has a cable lead-through portion of said high-voltage cable disposed therein;

said support member being arranged in at least one of said first slot, said second slot, and said third slot in resilient fixation with the cable lead-through and configured to exert a pressure against said cable lead-through;

said support member being disposed between said cable lead-through and a side wall of the at least one of said first slot, said second slot, and said third slot;

a spring material being positioned between the cable lead-through and the side wall of said at least one of said first slot, said second slot, and said third slot; and said support member and said spring material are formed as an elongated pressure element running in a same direction as the cable lead-through.

4. The machine of claim 3, further comprising:

a cable output configured to be directly connected to a power network without an intermediate transformer therebetween.

5. The machine of claim 3, wherein:

said support member comprises a tube having a sleeve containing a pressure-hardened material.

6. The machine of claim 3, wherein:

said pressure-hardened material being an epoxy.

7. The machine of claim 3, wherein:

said support member comprises a tube having a sleeve containing a pressurized fluid.

8. The machine of claim 3, further comprising:

additional elongated pressure elements, wherein at least a majority of said elongated pressure element and said additional elongated pressure elements are configured to exert pressure on said cable lead-through and an adjacent cable lead-through.

9. The machine of claim 3, wherein:

an axial section of at least one of said first slot, said second slot, and said third slot having a profile with a varying cross-section in which, said side wall and an opposing side wall immediately opposite the cable lead-through each have, a circular portion that corresponds to an outer diameter of the high-voltage cable, and a waist portion, being more narrow than said circular portion, and said elongated pressure element being disposed in said waist portion.

10. The machine of claim 9, wherein:

said axial section includes another waist portion being a single-sided waist portion defined on said side wall by a tangential plane to said circular portion and the opposing side wall and a connecting plane situated between and substantially parallel to a corresponding tangential plane and a plane connecting respective centers of the circular portion for the side wall and the opposing side wall, and said elongated pressure element being arranged at the side wall constituting the tangential plane.

11. The machine of claim 3, wherein:

said elongated pressure element, and another elongated pressure element, being arranged on a same side wall of the at least one of said first slot, said second slot, and said third slot.

12. The machine of claim 3, wherein:

said elongated pressure member and said spring material being arranged close to a same wall of said at least one of said first slot, said second slot, and said third slot, said spring material being joined to the elongated pressure element.

13. The machine of claim 12, wherein:

said spring material including a pad of elastic material applied on the support member.

14. The machine of claim 13, wherein:

said pad has a slot formed therein.

15. The machine of claim 3, wherein:

said elongated pressure element and said spring material being respectively positioned close to different walls of the at least one of said first slot, said second slot, and said third slot.

16. The machine of claim 15, wherein said spring member being of a sheet of elastic material.

17. The machine of claim 16, wherein:

the sheet of elastic material includes slots formed therein.

18. The machine of claim 16, wherein said elastic material comprises rubber.

19. The machine of claim 1, wherein:

a corrugated sheet surrounds at least a portion of the cable lead-through in at least one of said first slot, said second slot, and said third slot.

20. The machine of claim 19, wherein:

the corrugated sheet surrounds the high-voltage cable continuously around an entire circumference of the high-voltage cable and along an entire axial length of the high-voltage cable in the at least one of said first slot, said second slot, and said third slot.

21. The machine of claim 19, wherein:

a largest diameter of the corrugated sheet being substantially equal to a width of the at least one of said first slot, said second slot, and said third slot; and a depth of a corrugation in said corrugated sheet being sufficient to absorb a thermal expansion of the high-voltage cable during operation of the machine.

22. The machine of claim 19, wherein:

the corrugated sheet being formed from an elastically deformable material.

23. The machine of claim 19, further comprising:

a casting compound disposed between the corrugated sheet and the at least one of said first slot, said second slot, and said third slot.

24. The machine of claim 19, wherein:

the corrugated sheet being formed from a separate tubular corrugated sheet applied around the second semiconducting layer, said second semiconducting layer being an outer semiconducting layer of the high-voltage cable.

25. The machine of claim 24, wherein:

corrugations formed on the corrugated sheet being annular corrugations.

26. The machine of claim 19, wherein:

a surface of said corrugated sheet having corrugations formed in the second semiconducting layer of the high-voltage cable, said second semiconducting layer being an outer semiconducting layer.

27. The machine of claim 26, wherein:

the corrugations in the second semiconducting layer being oriented in a longitudinal direction of the high-voltage cable.

28. The machine of claim 1, wherein:

said support member includes an elongated elastic support element arranged along and in contact with a cable lead-through of said high-voltage cable disposed in said first slot, said second slot, and said third slot.

29. The machine of claim 28, wherein:

the support member shaped to extend along an entire axial extension of the stator.

30. The machine of claim 28, wherein:

the support member being a hose.

31. The machine of claim 30, wherein:

the hose encloses a pressure medium.

32. The machine of claim 31, wherein:

the pressure medium being a fluid.

33. The machine of claim 31, wherein:

the hose being sealed at both ends thereof.

34. The machine of claim 32, wherein:

the fluid of the pressure medium being configured to communicate with a pressure source.

35. The machine of claim 31, wherein:

the pressure medium consists of an elastic material in a solid form.

36. The machine of claim 35, wherein:

the elastic material having a cavity running axially therethrough.

37. The machine of claim 36, wherein:

the cavity having a non-circular cross-section.

38. The machine of claim 35, wherein the pressure medium comprises silicon rubber.

39. The machine of claim 38, wherein:

said slot in a radial plane having a profile with respective wide parts and narrow parts alternating in a radial direction.

40. The machine of claim 39, wherein:

the narrow parts being asymmetrically positioned in relation to a central plane running radially through at least one of said first slot, said second slot, and said third slot.

41. The machine of claim 40, wherein:

respective of the narrow parts being mere-inverted in relation to a nearest adjacent narrow part of the respective narrow parts when viewed in a direction of the radial plane.

42. The machine of claim 38, wherein:

said support element abuts the cable lead-through and an adjacent cable lead-through of the stator winding.

43. The machine of claim 3, wherein said support member comprises a tube having a sleeve containing a pressure medium in solid form.

44. The machine of claim 43, wherein said pressure medium comprises silicon rubber.

45. The machine of claim 43, wherein said pressure medium in solid form includes a cavity running axially therethrough.

46. A rotating electric machine configured to operate at high-voltages comprising:

a high-voltage magnetic circuit having, a magnetic core, and a stator winding of a high-voltage cable, said high-voltage cable having, a conductor configured to carry electrical current and having respective strands, an inner semiconducting layer arranged to surround and be in contact with said conductor, a solid insulation layer arranged to surround and be in contact with said inner semiconducting layer, and an outer semiconducting layer arranged to surround and be in contact with said solid insulation layer, said second semiconductor layer being formed from an extruded material that is configured to protect said stator winding from being damaged when drawn through said first slot, said second slot, and said third slot; and a support member positioned along and in contact with said stator winding.

47. The machine according to claim 46, wherein:

said magnetic core includes a first slot, a second slot, and a third slot in which said high-voltage cable of said stator winding is disposed;

said inner semiconducting layer and said outer semiconducting layer being configured to provide respective equipotential surfaces.

48. A method for manufacturing a rotating electric machine configured to operate at high-voltages, comprising the steps of:

forming a winding for a stator by positioning a cable in a first slot, a second slot, and a third slot of the stator, said cable being configured to hold a high-voltage and having an insulation system including a first semiconducting layer, a solid insulation layer arranged to surround and be in contact with. said first semiconducting layer, and a second semiconducting layer arranged to surround and be in contact with said solid insulation layer, said second semiconductor layer being formed from an extruded material that is configured to protect said stator winding from being damaged when drawn through said first slot, said second slot, and said third slot, said first semiconducting layer and said second semiconducting layer providing respective equipotential surfaces; and inserting an elongated support member axially in at least one of said first slot, said second slot, and said third slot and in contact with said cable.

49. The method of claim 48, wherein: said inserting step comprises inserting a hose-like element as said elongated support element in the at least one of said first slot, said second slot, and said third slot; and filling the hose-like element with a pressure medium.

50. The method of claim 49, wherein:

said filling step comprises filling the hose-like element with a curable material; and hardening the curable material under pressure.

51. The method of claim 49, wherein:

said filling step, comprises filling said hose-like element with epoxy.

52. The method of claim 49, wherein:

said inserting step comprises inserting said hose-like element after said cable has been inserted in said at least one of said first slot, said second slot, and said third slot.

53. The method of claim 49, wherein:

said inserting step comprises inserting said hose-like element in said at least one of said first slot, said second slot, and said third slot, and in at least another slot in a forwards and backwards pattern.

54. The method of claim 48, further comprising:

surrounding the cable with a corrugated sheath before inserting the cable into the at least one of said first slot, said second slot, and said third slot.

55. The method of claim 54, wherein said surrounding step comprises applying a separate tubular corrugated sheet around the cable before inserting the cable into the at least one of said first slot, said second slot, and said third slot.

56. The method of claim 55 wherein said surrounding step comprises applying a lubricant on the cable in an axial direction.

57. The method of claim 54, wherein:

said surrounding step comprises surrounding the corrugated sheath by applying a separate tubular corrugated sheath in the at least one of said first slot, said second slot, and said third slot before inserting the cable into the at least one of said first slot, said second slot, and said third slot.

58. The method of claim 54, further comprising the step of: inserting a casting compound between the corrugated sheath and a wall of the at least one of said first slot, said second slot, and said third slot.

59. The method of claim 58, further comprising the step of:

casting axial cooling tubes in the casting compound.

60. The method of claim 54, wherein said surrounding step, comprises surrounding the cable with the corrugated sheath, wherein said corrugated sheath includes annular corrugations.

61. The method of claim 54, wherein said step of surrounding comprises surrounding a cable with the corrugated sheath having annular corrugations that run in a helical direction.

62. The method of claim 54, wherein:

said surrounding step comprises surrounding the cable with the second semiconducting layer as an outer semiconducting layer, said second semiconducting layer having corrugations; and said corrugated sheath comprises the second semiconducting layer.

63. The method of claim 62, wherein said surrounding step, comprises surrounding the cable with the corrugations running in a longitudinal direction.

64. The method of claim 62, further comprising the step of:

extruding the outer semiconducting layer of the cable.

65. The method of claim 48, wherein:

said inserting step includes subjecting the support element to an axial tensile force to reduce a cross-sectional profile of the support element and allow passage of said support element into said space; and releasing the tensile force when the support element is in position so as to expand the cross-sectional profile of the support element.

66. The method of claim 48, wherein:

said inserting step comprises inserting said support element in an axial direction after winding the stator.

67. The method of claim 66, wherein:

said inserting step comprises inserting the support element into a space between a cable lead-through of said cable and a wall of at least one of said first slot, said second slot, and said third slot while having said support element maintain a state that enables said support element to pass through a profile of said at least one of said first slot, said second slot, and said third slot without obstruction or resistance in an axial cross-section of said at least one of said first slot, said second slot, and said third slot; and expanding transversely said support element in an axial direction after said inserting step.

68. The method of claim 67, wherein:

said inserting step, comprises inserting a thin walled elastic hose as said support element, when said thin walled elastic hose is decompressed during insertion and such that a thinness and elasticity of said thin walled elastic hose is sufficient so as to be deformed without noticeable resistance for allowing passage of the thin walled elastic hose through the space.

69. The method of claim 67, wherein:

said inserting step comprises inserting the support element when surrounding an elongated body along an entire length of the thin walled elastic hose such that a cross-sectional dimension of said body and said hose, having a void space formed therebetween, and filling said void space with a hardening elastic material after said support element is inserted into at least one of said first slot, said second slot, and said third slot and expanding the hose traversely to the axial direction.

70. The method of claim 69, wherein:

said filling step comprises filling the elongated body, which includes an inner, thin-walled hose with a pressure medium before said void space is filled.

71. The method of claim 70 further comprising:

removing the elongated body from the void space after the void space is filled and said pressure medium hardened, said elongated body being a rod element.

72. The method of claim 71, wherein the rod element having a profile with longitudinal ridges thereon.

73. The method of claim 67, wherein said support element having a cross-sectional profile such that sufficient clearance is provided for inserting said support member into said space.

74. The method of claim 67 wherein:

said inserting step includes inserting the support element, said support element being a hose having a cross-sectional profile, said cross-sectional profile being less than a cross-sectional profile of said space, and filling the hose with a pressured medium when the hose is in place.

75. The method of claim 74, wherein said filling step comprises filling the hose with a cold-setting material as said pressure material.

76. The method of claim 74, wherein:

said filling step comprises filling said hose with at least one of a gas and a liquid, and sealing the hose at respective ends thereof after said hose is filled with the pressure medium.

77. The method of claim 74, wherein:

said filling step comprises filling the hose with at least one of a gas and a liquid while maintaining communication between the pressure medium and a pressure source even while the rotating machine is in operation.

78. The method of claim 74, wherein said filling step comprises expanding the hose with a rod-shaped body as said pressure medium so as to expand said hose.

79. The method of claim 66 wherein:

said inserting step includes forcibly deforming the support element, said support element being a hose, and releasing the hose from the deformed state after inserting the hose into the space.

80. The method of claim 79, wherein:

said forcibly deforming step includes gluing the hose so as to assume a forcibly deformed state, and releasing an adhesive joint made by said glue when the hose is in place.

81. The method of claim 79, wherein:

said inserting step includes subjecting an interior of the hose to a negative pressure, and releasing the negative pressure when the hose is in place.

* * * * *

UNITED STATES PATENT AND TRADEMARK OFFICE

CERTIFICATE OF CORRECTION

PATENT NO. : 6,972,505 B1
DATED : December 6, 2005
INVENTOR(S) : Leijon et al.

It is certified that error appears in the above-identified patent and that said Letters Patent is hereby corrected as shown below:

Title page,
Item [73], Assignee, should read:
-- ABB AB, Vasteras (SE) --.

Signed and Sealed this

Seventh Day of February, 2006

JON W. DUDAS
*Director of the United States Patent and Trademark Office*